（12）United States Patent
Mizuno

(10) Patent No.: US 12,541,995 B2
(45) Date of Patent: Feb. 3, 2026

(54) VERIFICATION SYSTEM, VERIFICATION METHOD, AND VERIFICATION PROGRAM OF ID CARD

(71) Applicant: FUJIFILM Corporation, Tokyo (JP)

(72) Inventor: Tomohiro Mizuno, Kanagawa (JP)

(73) Assignee: FUJIFILM Corporation, Tokyo (JP)

(*) Notice: Subject to any disclaimer, the term of this patent is extended or adjusted under 35 U.S.C. 154(b) by 171 days.

(21) Appl. No.: 18/310,535

(22) Filed: May 2, 2023

(65) Prior Publication Data

US 2023/0274576 A1 Aug. 31, 2023

Related U.S. Application Data

(63) Continuation of application No. PCT/JP2021/040423, filed on Nov. 2, 2021.

(30) Foreign Application Priority Data

Nov. 11, 2020 (JP) ................. 2020-188314

(51) Int. Cl.
*G06V 40/16* (2022.01)
*G06T 5/50* (2006.01)
(Continued)

(52) U.S. Cl.
CPC .............. *G06V 40/172* (2022.01); *G06T 5/50* (2013.01); *G06T 7/11* (2017.01); *G06T 7/30* (2017.01);
(Continued)

(58) Field of Classification Search
CPC .. G06V 40/172; G06V 40/169; G06V 10/759; G06V 20/95; G06T 5/50;
(Continued)

(56) References Cited

U.S. PATENT DOCUMENTS

| 2001/0054149 A1 | 12/2001 | Kawaguchi et al. |
| 2002/0129255 A1* | 9/2002 | Tsuchiyama ......... G06T 1/0021 |
| | | 713/176 |

(Continued)

FOREIGN PATENT DOCUMENTS

| CN | 101093439 | 12/2007 |
| JP | H11283033 | 10/1999 |

(Continued)

OTHER PUBLICATIONS

"International Search Report (Form PCT/ISA/210) of PCT/JP2021/040423," mailed on Jan. 25, 2022, with English translation thereof, pp. 1-5.

(Continued)

*Primary Examiner* — Nicholas Pachol
(74) *Attorney, Agent, or Firm* — JCIPRNET

(57) ABSTRACT

A issuing apparatus is configured to acquire a first face image obtained by imaging a face of a person, output a verification image including the first face image and verification information for verifying validity to a printer that issues the ID card by printing the verification image on a card-shaped recording medium, and store, in a memory, a first captured image obtained by capturing the verification image printed on the ID card via a camera. A verification apparatus is configured to acquire, as a second captured image, an image obtained by capturing a verification image printed on an ID card to be verified via a camera, and verify authenticity of the ID card to be verified by comparing density characteristics of each of the first captured image acquired from the memory and the second captured image acquired from the camera.

16 Claims, 23 Drawing Sheets

(51) Int. Cl.
    *G06T 7/11*           (2017.01)
    *G06T 7/30*           (2017.01)
    *G06T 7/90*           (2017.01)
    *G06V 10/75*         (2022.01)
    *G06V 20/00*         (2022.01)
    *H04N 1/32*          (2006.01)
    *H04N 1/407*         (2006.01)

(52) U.S. Cl.
    CPC .............. *G06T 7/90* (2017.01); *G06V 10/759* (2022.01); *G06V 20/95* (2022.01); *G06V 40/169* (2022.01); *H04N 1/32144* (2013.01); *H04N 1/407* (2013.01); *G06T 2207/10024* (2013.01); *G06T 2207/20021* (2013.01); *G06T 2207/30201* (2013.01); *H04N 2201/3233* (2013.01); *H04N 2201/3269* (2013.01); *H04N 2201/3276* (2013.01)

(58) Field of Classification Search
    CPC ..... G06T 7/11; G06T 7/30; G06T 7/90; G06T 2207/10024; G06T 2207/20021; G06T 2207/30201; H04N 1/32144; H04N 1/407; H04N 2201/3233; H04N 2201/3269; H04N 2201/3276
    See application file for complete search history.

(56) References Cited

U.S. PATENT DOCUMENTS

| | | | | |
|---|---|---|---|---|
| 2004/0153649 | A1* | 8/2004 | Rhoads | G07D 7/0034 |
| | | | | 707/E17.112 |
| 2004/0223044 | A1* | 11/2004 | Oshima | B41M 3/12 |
| | | | | 347/213 |
| 2014/0294230 | A1* | 10/2014 | Nakano | B41J 2/435 |
| | | | | 283/85 |
| 2015/0365543 | A1* | 12/2015 | Iwata | H04N 1/00952 |
| | | | | 358/1.13 |
| 2022/0052996 | A1* | 2/2022 | Sjöholm | H04W 12/06 |
| 2023/0351779 | A1* | 11/2023 | Mizuno | H04N 1/407 |

FOREIGN PATENT DOCUMENTS

| | | |
|---|---|---|
| JP | 2001052142 | 2/2001 |
| JP | 2001160118 | 6/2001 |
| JP | 2002007977 | 1/2002 |
| JP | 2005053077 | 3/2005 |
| JP | 2005063077 | 3/2005 |
| JP | 2006201997 | 8/2006 |
| JP | 2006293972 | 10/2006 |
| WO | 2020126930 | 6/2020 |

OTHER PUBLICATIONS

"Written Opinion of the International Searching Authority (Form PCT/ISA/237) of PCT/JP2021/040423," mailed on Jan. 25, 2022, with English translation thereof, pp. 1-8.

"Notice of Reasons for Refusal of Japan Counterpart Application", issued on Mar. 11, 2025, with English translation thereof, p. 1-p. 5.

"The First Office Action of China Counterpart Application", issued on Nov. 25, 2025, with English translation thereof, p. 1-p. 27.

* cited by examiner

VERIFICATION SYSTEM, VERIFICATION METHOD, AND VERIFICATION PROGRAM OF ID CARD

CROSS-REFERENCE TO RELATED APPLICATION

This application is a continuation application of International Application No. PCT/JP2021/040423, filed Nov. 2, 2021, the disclosure of which is incorporated herein by reference in its entirety. Further, this application claims priority from Japanese Patent Application No. 2020-188314 filed on Nov. 11, 2020, the disclosure of which is incorporated herein by reference in its entirety.

BACKGROUND

1. Technical Field

The disclosed technology relates to a verification system, a verification method, and a verification program of an ID card.

2. Description of the Related Art

JP2002-007977A discloses a validity verification system for verifying validity of an identification data (ID) card such as an employee card and a student card. The ID card disclosed in JP2002-007977A includes an integrated circuit (IC) memory. An identifier, a face photo, and a verification image are recorded in the IC memory. The verification image is obtained by embedding electronic watermark information such as a random number in the face photo. A combination of the identifier and the electronic watermark information is stored in a database. In verification processing, in a case where a combination of the identifier recorded in the ID card and the electronic watermark information extracted from the verification image matches the combination of the identifier and the electronic watermark information stored in the database, it is determined that the ID card is valid.

SUMMARY

In the validity verification system disclosed in JP2002-007977A, validity indicating that information recorded in the ID card is valid is verified by collating verification information such as the identifier and the verification image recorded in the ID card with verification information stored in advance in the database. In addition, since the face photo is recorded in the ID card, identity verification of checking whether or not an identity of a person having the ID card is correct can be performed by visual checking or the like.

Verification requirements for increasing security of the ID card include authenticity in addition to the identity verification and the validity. The authenticity indicates that the ID card is not forged. In the validity verification system disclosed in JP2002-007977A, there is no disclosure related to verification of the authenticity. However, since the ID card disclosed in JP2002-007977A includes the IC memory, the authenticity can be verified by storing various types of information for verifying the authenticity in the IC memory. In addition, for the ID card with the IC memory, even simple duplication is difficult, and the authenticity is easily guaranteed because of the difficulty of duplication.

However, a procedure of issuing the ID card with the IC memory not only takes time but also simply increases cost. Not all ID cards are used for a long term like the employee card and the student card. Among ID cards, there is also an ID card that is expected to be used for a short term, such as an ID card used as a visitor card in an event such as an exhibition. Such an ID card that is expected to be used for a short term has a constraint on the issuing cost and also needs to be instantly issued in a venue on the day of the event. Thus, the issuing procedure is required to be simple and quick.

In a case of simply and quickly issuing the ID card at a low cost, it is difficult to employ a solution of increasing functionality of the ID card such as providing the IC memory. As a realistic method, for example, a method of creating the ID card by printing the face photo and the verification information used for verifying the validity on a paper sheet of a card shape is considered. However, since such an ID card is easily forged, it is an object to verify the authenticity of the ID card with a simple configuration on the assumption that forgery occurs.

An aim of the disclosed technology is to provide a verification system, a verification method, and a verification program of an ID card that, compared to the technology of the related art, can issue an ID card with which identity verification and validity verification can be simply and quickly performed at a low cost, and that can perform authenticity verification of the ID card with a simple configuration.

A verification system of an ID card according to an aspect of the present disclosure is a verification system comprising an issuing apparatus that issues an ID card, and a verification apparatus that verifies the ID card. The issuing apparatus includes a first processor, and the first processor is configured to acquire a first face image obtained by imaging a face of a person, output a verification image including the first face image and verification information for verifying validity to a printer that issues the ID card by printing the verification image on a card-shaped recording medium, and store, in a memory, a first captured image obtained by capturing the verification image printed on the ID card via a camera. The verification apparatus includes a second processor, and the second processor is configured to acquire, as a second captured image, an image obtained by capturing a verification image printed on an ID card to be verified via a camera, and verify authenticity of the ID card to be verified by comparing density characteristics of each of the first captured image acquired from the memory and the second captured image acquired from the camera.

It is preferable that the second processor is configured to, even in a case where the same image is printed on recording media of the same type, verify the authenticity of the ID card to be verified using uncertainty of a color optical density that is variation in a state of occurrence of density unevenness for each printing.

It is preferable that the second processor is configured to, even in a case where the same image is printed on recording media of the same type, verify the authenticity of the ID card to be verified using variation in a frequency characteristic of a color optical density of the image for each printing.

It is preferable that the second processor is configured to verify the authenticity of the ID card to be verified by taking into consideration a change in time of a color optical density of the verification image printed on the ID card to be verified and then, by comparing the density characteristics.

It is preferable that a collation part used for comparing the density characteristics is included in a part of the verification image, and the second processor is configured to verify the authenticity of the ID card to be verified by comparing density characteristics of the collation part of each of the first captured image and the second captured image.

It is preferable that the collation part is a plain solid pattern composed of one color.

It is preferable that the printer is a printer of a density modulation method.

It is preferable that the printer is an instant photo printer that uses an instant film developing color via a photosensitive material including a silver salt as the recording medium.

It is preferable that the second processor is configured to acquire a face of a person who is an owner of the ID card to be verified as a second face image, and verify that an identify of the owner of the ID card to be verified is correct by comparing a feature amount of the face extracted from the first face image included in the second captured image with a feature amount of the face extracted from the second face image.

It is preferable that the first processor is configured to embed the feature amount of the face extracted from the first face image in the verification image, and the second processor is configured to verify that an identity of the person is the owner of the ID card by comparing the feature amount of the face extracted from the verification image included in the second captured image with the feature amount of the face extracted from the second face image.

It is preferable that the verification information and the feature amount of the face are embedded in the verification image as an electronic watermark.

It is preferable that the first processor and the printer are incorporated in one housing.

It is preferable that the camera that acquires the first captured image is incorporated in the housing.

It is preferable that the first captured image and the second captured image are acquired by cameras having the same imaging performance.

It is preferable that the second processor is configured to correct the second captured image based on a difference in imaging performance between the camera that acquires the first captured image and the camera that acquires the second captured image, and verify the authenticity of the ID card to be verified using the second captured image after correction.

A verification method of an ID card using an issuing apparatus of an ID card and a verification apparatus of the ID card according to another aspect of the present disclosure comprises causing the issuing apparatus of the ID card to execute a first face image acquisition step of acquiring a first face image obtained by imaging a face of a person, an output step of outputting a verification image including the first face image and verification information for verifying validity to a printer that issues the ID card by printing the verification image on a card-shaped recording medium, and a storage step of storing, in a memory, a first captured image obtained by capturing the verification image printed on the ID card via a camera, and causing the verification apparatus of the ID card to execute a second captured image acquisition step of acquiring, as a second captured image, an image obtained by capturing a verification image printed on an ID card to be verified via a camera, and a verification step of verifying authenticity of the ID card to be verified by comparing density characteristics of each of the first captured image acquired from the memory and the second captured image acquired from the camera.

A verification program of an ID card according to still another aspect of the present disclosure is a verification program of an ID card for operating a verification system of an ID card including a first computer that issues an ID card, and a second computer that verifies the ID card. The verification program of the ID card causes the first computer to function as a first face image acquisition unit that acquires a first face image obtained by imaging a face of a person, an output unit that outputs a verification image including the first face image and verification information for verifying validity to a printer that issues the ID card by printing the verification image on a card-shaped recording medium, and a storage unit that stores, in a memory, a first captured image obtained by capturing the verification image printed on the ID card via a camera, and causes the second computer to function as a second captured image acquisition unit that acquires, as a second captured image, an image obtained by capturing a verification image printed on an ID card to be verified via a camera, and a verification unit that verifies authenticity of the ID card to be verified by comparing density characteristics of each of the first captured image acquired from the memory and the second captured image acquired from the camera.

According to the disclosed technology, it is possible to provide a verification system, a verification method, and a verification program of an ID card that, compared to the technology of the related art, can issue an ID card with which identity verification and validity verification can be simply and quickly performed at a low cost, and that can perform authenticity verification of the ID card with a simple configuration.

BRIEF DESCRIPTION OF THE DRAWINGS

Exemplary embodiments according to the technique of the present disclosure will be described in detail based on the following figures, wherein.

DETAILED DESCRIPTION

First Embodiment

Figure 1:
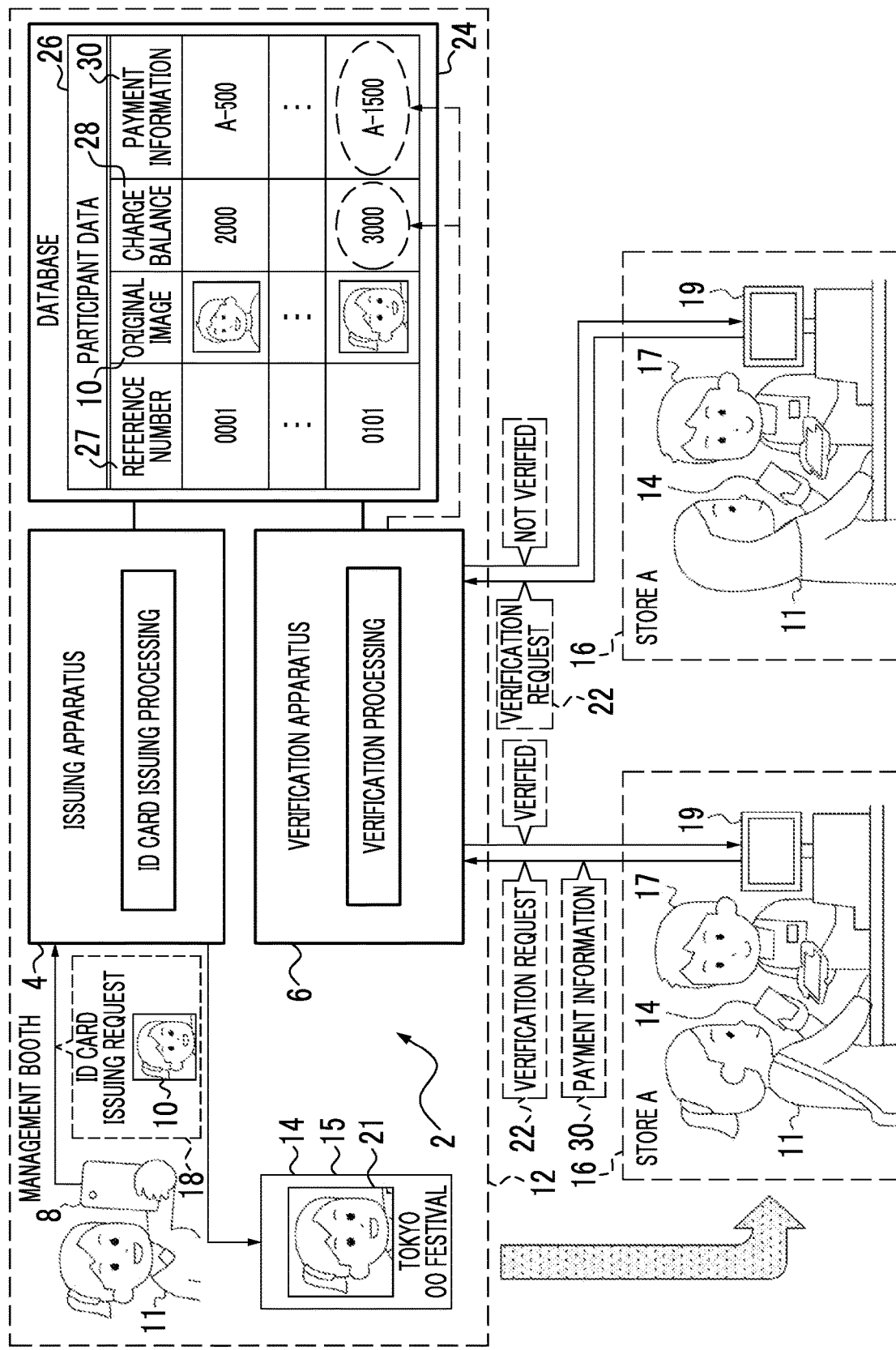
FIG. 1 is a schematic diagram of a verification system.

As illustrated in FIG. 1 as an example, a verification system 2 of an ID card comprises an issuing apparatus 4 that issues an ID card 14, and a verification apparatus 6 that verifies the ID card 14. For example, the verification system 2 is used in an outdoor or indoor event venue in which a plurality of stores 16 are exhibiting. For example, the ID card 14 is issued to a participant 11 of an event in exchange for an admission fee of the event venue. The ID card 14 is used to prove that the participant 11 is an authorized visitor of the event. The ID card 14 is a participant card for identifying the participant 11. As an example, an unauthorized participant 11 in the event venue can be excluded by verifying the ID card 14 at key points such as each store 16 in the event venue.

In addition, in the present example, the ID card 14 also functions as a prepaid card in the event venue. The participant 11 can use the ID card 14 for payment of food and/or goods sales and the like at each store 16. Payment information 30 of services or the like used by the participant 11 is managed through the ID card 14. The verification system 2 is an example of a "verification system" according to an embodiment of the disclosed technology. The issuing apparatus 4 is an example of an "issuing apparatus" according to the embodiment of the disclosed technology. The verification apparatus 6 is an example of a "verification apparatus" according to the embodiment of the disclosed technology. The ID card 14 is an example of an "ID card" according to the embodiment of the disclosed technology.

As an example, the ID card 14 is issued as follows by the participant 11 using a smart device 8 of the participant 11. The issuing apparatus 4 and the verification apparatus 6 are installed in a management booth 12 provided in the event venue. The participant 11 who participates in the event first stops by the management booth 12. At the management booth 12, the participant 11 accesses a website for issuing the ID card using the smart device 8 of the participant 11. For example, a uniform resource locator (URL) for accessing the website is provided to the participant 11 in exchange for a purchase of an admission ticket. The participant 11 images a face of the participant 11 by operating the smart device 8 in accordance with an instruction described on the website. An ID card issuing request 18 including an image 10 that is obtained by imaging and that includes the face of the participant 11 is transmitted to the issuing apparatus 4 from the smart device 8. The image 10 including the face will be referred to as an original image 10 below for distinction from a face image, described later. The issuing apparatus 4 receives the ID card issuing request 18 and performs ID card issuing processing in accordance with the received ID card issuing request 18.

In the present example, an example in which the participant 11 images the face of the participant 11 using the smart device 8 of the participant 11 and transmits the ID card issuing request 18 from the smart device 8 is described. This is an example of a form of transmitting the ID card issuing request 18. In the embodiment of the disclosed technology, a reception apparatus with a camera disposed in the management booth 12 may image the face of the participant 11 and transmit the ID card issuing request 18 instead of the smart device 8 of the participant 11. In addition, reception staff in the event venue may image the face of the participant 11 using a smart device, and the reception staff may transmit the ID card issuing request 18 from the smart device.

The issuing apparatus 4 incorporates a printer 20 (refer to FIG. 2) that can print an image on an instant film 15. In the ID card issuing processing, the issuing apparatus 4 generates a verification image 21 based on the original image 10 included in the ID card issuing request 18 and prints the verification image 21 on the instant film 15 using the printer 20.

As is well known, the instant film 15 is a photo film of a self-development treatment type that can be developed within several minutes after the image is exposed. An instant film of a well-known monosheet type is used as the instant film 15. The instant film 15 has basic constituents of the instant film of the well-known monosheet type such as a photosensitive sheet, an image receiving sheet, a development pod containing development treatment liquid, and a trap unit that absorbs an excess developer. The photosensitive sheet has a photosensitive material including a silver salt and develops color by exposing the photosensitive material. More specifically, in the instant film 15, a latent image is optically formed by exposing the photosensitive sheet. After the latent image is formed, the photosensitive sheet and the image receiving sheet are overlaid on each other. In this state, a positive image is transferred to the image receiving sheet by pressurizing both sheets while applying the development treatment liquid between both sheets.

In the instant film 15, for example, in a blank other than an exposure region in which the image is exposed, a text "Tokyo OO Festival" indicating an event name is printed in advance, and a mark indicating that the instant film 15 is used in the event is displayed. The printer 20 issues the ID card 14 by printing the verification image 21 on the instant film 15. The printer 20 is an example of a "printer" according to the embodiment of the disclosed technology. The verification image 21 is an example of a "verification image" according to the embodiment of the disclosed technology. The instant film 15 is an example of a "card-shaped recording medium" according to the embodiment of the disclosed technology.

In the present example, since the ID card 14 functions as a prepaid card, the participant 11 can charge any amount of money to the ID card 14. For example, the participant 11 can charge any amount of money to the issued ID card 14 using a charging apparatus (not illustrated) installed in the management booth 12.

The participant 11 shops in the event venue using the ID card 14. In a case where the participant 11 presents the ID card 14 to a cashier 17 of each store 16 at each checkout in the store 16 in the event venue, a verification request 22 is transmitted to the verification apparatus 6 from a point of sale (POS) terminal 19 of each store 16 by operation of the cashier 17. The verification apparatus 6 receives the verification request 22 and performs verification processing in accordance with the received verification request 22.

While details will be described later, the verification processing includes identity verification processing of verifying that an identity of an owner of the ID card 14 to be verified is a creator of the ID card 14, validity verification processing of verifying that the ID card 14 to be verified is a card having valid access permission to the verification system 2, and authenticity verification processing of verifying that the ID card 14 to be verified is not a forged card. In a case where the verification apparatus 6 has verified the ID card 14 to be verified through the verification processing, the payment information 30 of the participant 11 is transmitted to the verification apparatus 6. The payment information 30 is data including a store name of the store 16 and an amount of money to be paid. Accordingly, the amount of money to be paid is withdrawn from a charge balance 28 charged in the ID card 14 to be verified. In a case where the verification apparatus 6 has not verified the ID card 14 to be verified, the payment information 30 is not transmitted, and the withdrawal from the charge balance 28 is not made.

The issuing apparatus 4 and the verification apparatus 6 are connected to a database 24. The database 24 stores participant data 26. The participant data 26 stores, for each participant 11, a reference number 27 assigned to each participant 11, the original image 10 included in the ID card issuing request 18, the charge balance 28 charged in the ID card 14, and the payment information 30 transmitted from the store 16. Each time the payment information 30 is transmitted to the verification apparatus 6 from the POS terminal 19, the transmitted payment information 30 is accumulated in the database 24, and the charge balance 28 of the participant 11 is updated by subtracting the amount of money corresponding to the payment information 30 from the charge balance 28. Instead of charging any amount of money to the ID card 14, the participant 11 may pay a total of the amount of money to be paid later in accordance with the payment information 30 accumulated in the database 24.

Figure 2:
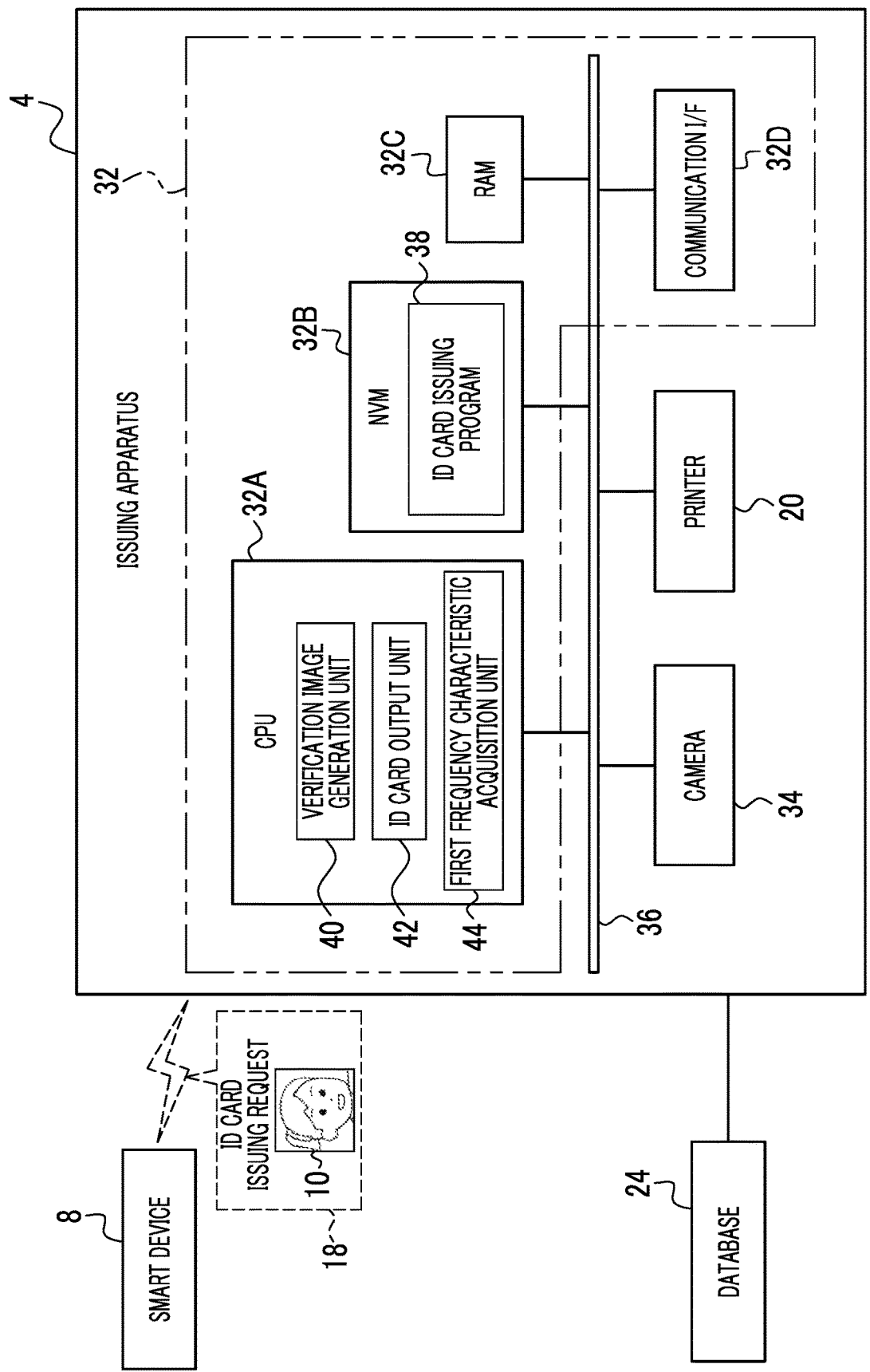
FIG. 2 is a block diagram of an issuing apparatus.

As illustrated in FIG. 2 as an example, the issuing apparatus 4 comprises a computer 32, a camera 34, and the printer 20. The computer 32, the camera 34, and the printer 20 are incorporated in one housing. The computer 32 includes a central processing unit (CPU) 32A, a non-volatile memory (NVM) 32B, a random access memory (RAM) 32C, and a communication interface (I/F) 32D. The CPU 32A, the NVM 32B, the RAM 32C, the communication I/F 32D, the camera 34, and the printer 20 are connected to each other through a bus 36.

The CPU 32A controls the entire issuing apparatus 4. The NVM 32B is a non-volatile memory. Here, an electrically erasable programmable read-only memory (EEPROM) is employed as an example of the NVM 32B. However, the disclosed technology is not limited thereto. A flash memory or the like may be employed, or a combination of a plurality of non-volatile memories may be employed. The RAM 32C is a volatile memory. The RAM 32C is used as a work memory by the CPU 32A.

The communication I/F 32D is implemented by, for example, a device including a field-programmable gate array (FPGA). The communication I/F 32D is connected to the database 24 and exchanges various types of information between the CPU 32A and the database 24. In addition, the communication I/F 32D is connected to the smart device 8 of the participant 11 through a communication network such as a wireless local area network (LAN) or a wireless wide area network (WAN) and exchanges various types of information between the CPU 32A and the smart device 8.

In the present example, the printer 20 is an instant photo printer that uses the instant film 15 as a recording medium. For example, the printer 20 comprises a liquid crystal display (LCD) as an exposure device. In the printer 20, the exposure device is disposed in a posture in which an image display surface on which the image is displayed faces a photosensitive surface of the instant film 15. The printer 20 exposes the photosensitive material of the instant film 15 to light by displaying the image to be printed on the exposure device. As described above, the instant film 15 is a film that develops color via the photosensitive material including a silver salt. In addition, since the printer 20 uses the instant film 15 as a recording medium, the printer 20 is, of course, a printer of a density modulation method that forms an image by changing a color optical density of a photosensitive material in accordance with an exposure amount.

The printer 20, under control of the CPU 32A, prints the verification image 21 generated based on the original image 10 included in the ID card issuing request 18, on the instant film 15 (refer to FIG. 1) and outputs the printed instant film 15 as the ID card 14 (refer to FIG. 1). While details will be described later, the camera 34 acquires a first captured image 46 (refer to FIG. 5) by imaging the ID card 14 output from the printer 20. The cam 34 is an example of a "camera" according to the embodiment of the disclosed technology. The first captured image 46 is an example of a "first captured image" according to the embodiment of the disclosed technology.

The NVM 32B stores an ID card issuing program 38. The CPU 32A operates as a verification image generation unit 40, an ID card output unit 42, and a first frequency characteristic acquisition unit 44 by reading out the ID card issuing program 38 from the NVM 32B and by executing the read-out ID card issuing program 38 on the RAM 32C. The verification image generation unit 40, the ID card output unit 42, and the first frequency characteristic acquisition unit 44 perform the ID card issuing processing in cooperation with each other. The verification image generation unit 40, the ID card output unit 42, and the first frequency characteristic acquisition unit 44 are an example of a "first processor" according to the embodiment of the disclosed technology.

Hereinafter, an example of the ID card issuing processing performed by the issuing apparatus 4 will be specifically described with reference to FIG. 3 to FIG. 10.

Figure 3:
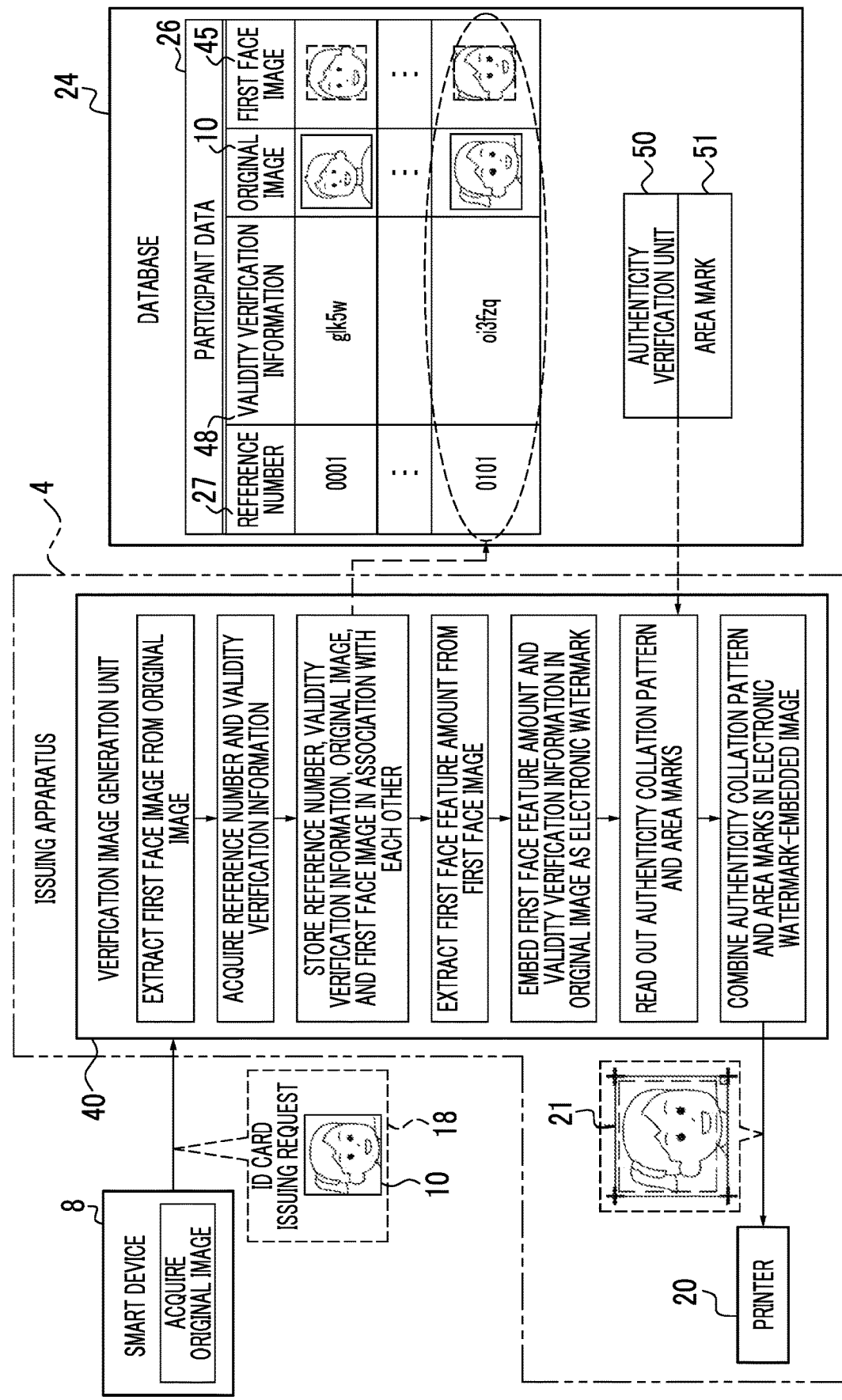
FIG. 3 is a descriptive diagram illustrating an example of processing performed by a verification image generation unit.

As illustrated in FIG. 3 as an example, in a case where the ID card issuing request 18 including the original image 10 is received from the smart device 8, the verification image generation unit 40 extracts a first face image 45 showing a face of a person from the original image 10 using a well-known face recognition technology. As a method of extracting the first face image 45, for example, a well-known face recognition technology such as a method of performing contour extraction by performing processing such as edge detection on the original image 10, specifying contours of a face by pattern matching from extracted contours, and extracting a region within the specified contours of the face as a face image, and a method using machine learning can be used. The first face image 45 is an example of a "first face image" according to the embodiment of the disclosed technology.

The verification image generation unit 40 acquires the reference number 27 and validity verification information 48. For example, the reference number 27 is an identification number of the participant 11 assigned for each participant 11 in order of registration of the participant 11. In the example illustrated in FIG. 3, a four-digit number of "0001" to "0101" is assigned to the participant 11. In addition, in FIG. 3, the reference number 27 of "0101" surrounded by a circular frame of a dotted line is the reference number 27 assigned to the participant 11 who has transmitted the most recent ID card issuing request 18 in FIG. 3.

The validity verification information 48 is, for example, a random number assigned for each participant 11 and functions as a password for accessing the verification apparatus 6. The validity verification information 48 is data used in the validity verification processing, described later. In the example illustrated in FIG. 3, a combination "oi3fzq" of characters and numbers is assigned to the participant 11 of the reference number 27 of "0101" as the validity verification information 48. The verification image generation unit 40 stores the acquired reference number 27 and the validity verification information 48, the original image 10, and the extracted first face image 45 in the database 24 in association with each other as the participant data 26. The validity verification information 48 is an example of "verification information" according to the embodiment of the disclosed technology.

The verification image generation unit 40 extracts a first face feature amount 47 (refer to FIG. 4) indicating a feature amount of the first face image 45 by performing image analysis on the first face image 45. As the feature amount of the face image used for the first face feature amount 47 and the like, for example, a well-known feature amount such as the Haar-like feature amount, the histograms of oriented gradients (HOG) feature amount, the scale invariant feature transform (SIFT), and the local binary pattern (LBP) feature amount can be used as appropriate. As a method of extracting the feature amount, for example, a well-known feature amount extraction technology such as a method using a trained model that is trained in advance to output a feature amount using a face image for training and that outputs the feature amount by taking the face image as an input can be used. The first face feature amount 47 is data used in the identity verification processing, described later. The first face feature amount 47 is an example of a "feature amount of a face" according to the embodiment of the disclosed technology.

The verification image generation unit 40 generates an electronic watermark-embedded image 49 (refer to FIG. 4) by embedding the first face feature amount 47 and the validity verification information 48 in the original image 10 as an electronic watermark. Furthermore, the verification image generation unit 40 generates the verification image 21 by combining an authenticity collation pattern 50 and an area mark 51 read out from the database 24 in the electronic watermark-embedded image 49. The authenticity collation pattern 50 and the area mark 51 may be stored in the NVM 32B instead of the database 24 as accessory information of the ID card issuing program 38.

Figure 4:
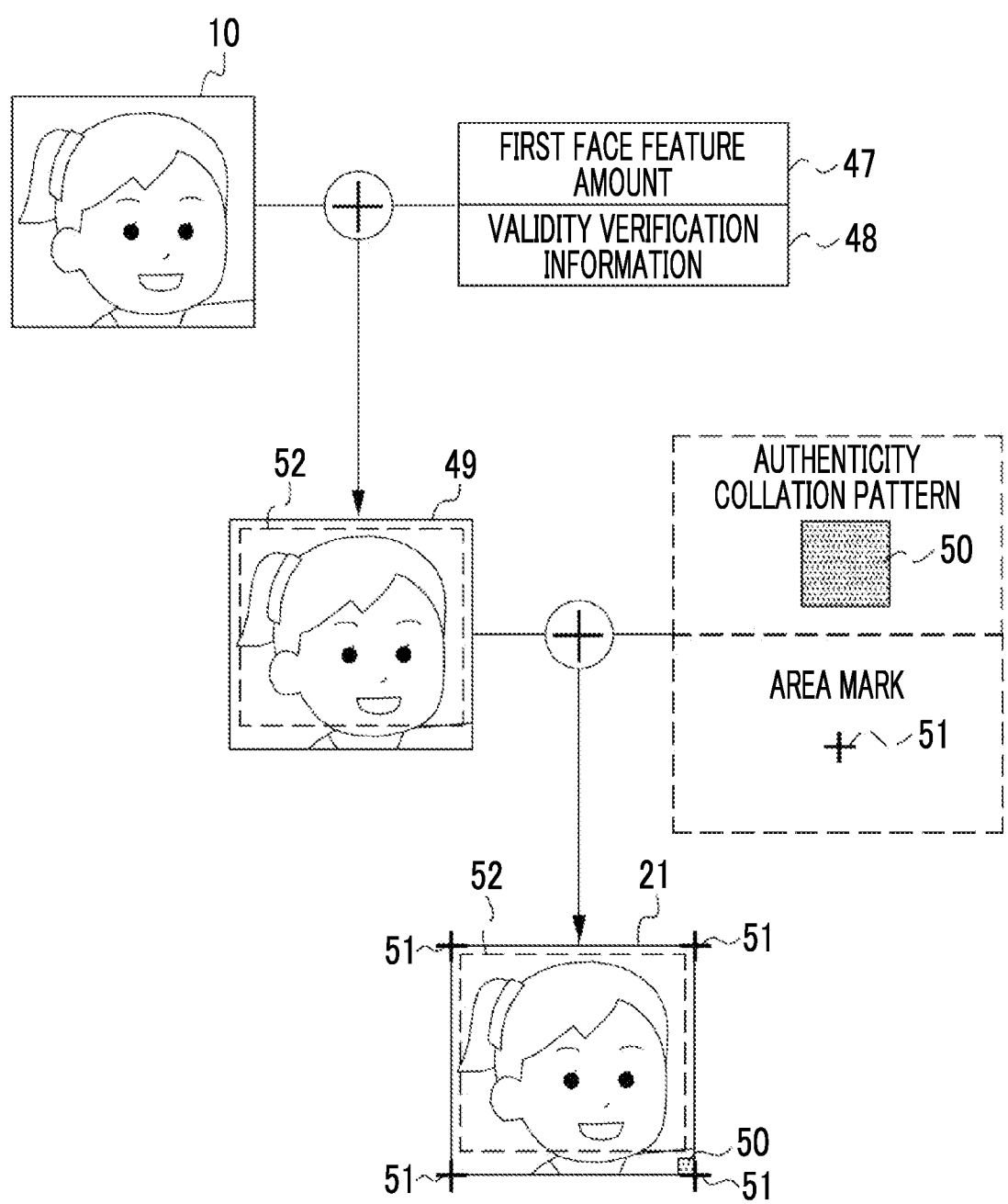
FIG. 4 is a descriptive diagram illustrating an example of a method of generating a verification image.

Specifically, as illustrated in FIG. 4 as an example, the verification image generation unit 40 generates the electronic watermark-embedded image 49, which is obtained by embedding the first face feature amount 47 and the validity verification information 48 in the original image 10 in an invisible form, by performing operation using a specific algorithm. In the example illustrated in FIG. 4, the first face feature amount 47 and the validity verification information 48 are embedded in the electronic watermark-embedded image 49 as an electronic watermark 52. The electronic watermark 52 refers to data that is invisible to eyes but detectable by performing specific operation processing on the electronic watermark-embedded image 49 using detection software or the like.

The verification image generation unit 40 reads out the authenticity collation pattern 50 and the area mark 51 from the database 24. For example, the authenticity collation pattern 50 is a plain solid pattern of one color having a square shape of which one side is several millimeters (mm). The area mark 51 is a mark having a cross shape of several mm to several tens of mm. While details will be described later, the area mark 51 is a mark for indicating where the electronic watermark 52 and the authenticity collation pattern 50 are recorded in the verification image 21.

The verification image generation unit 40 generates the verification image 21 by superimposing the authenticity collation pattern 50 at a lower right corner of the electronic watermark-embedded image 49 and by superimposing four area marks 51 at four corners of the electronic watermark-embedded image 49. In the present example, the electronic watermark 52 and the verification image 21 have almost the same size. Thus, four corners of the electronic watermark 52 can be indicated by disposing the area marks 51 at the four corners of the electronic watermark-embedded image 49. A recording position of the electronic watermark 52 is indicated by the four area marks 51. In addition, since the authenticity collation pattern 50 is disposed at the lower right corner of the electronic watermark-embedded image 49, a recording position of the authenticity collation pattern 50 is indicated by the area mark 51 at the lower right corner. In addition as will be described later, while the verification image 21 is captured by the camera 34, the area marks 51 are also used as marks indicating a cut-out area in which the electronic watermark-embedded image 49 is cut out from the first captured image 46 which is the verification image 21 captured by the camera 34. The verification image generation unit 40 outputs the generated verification image 21 to the printer 20.

Figure 5:
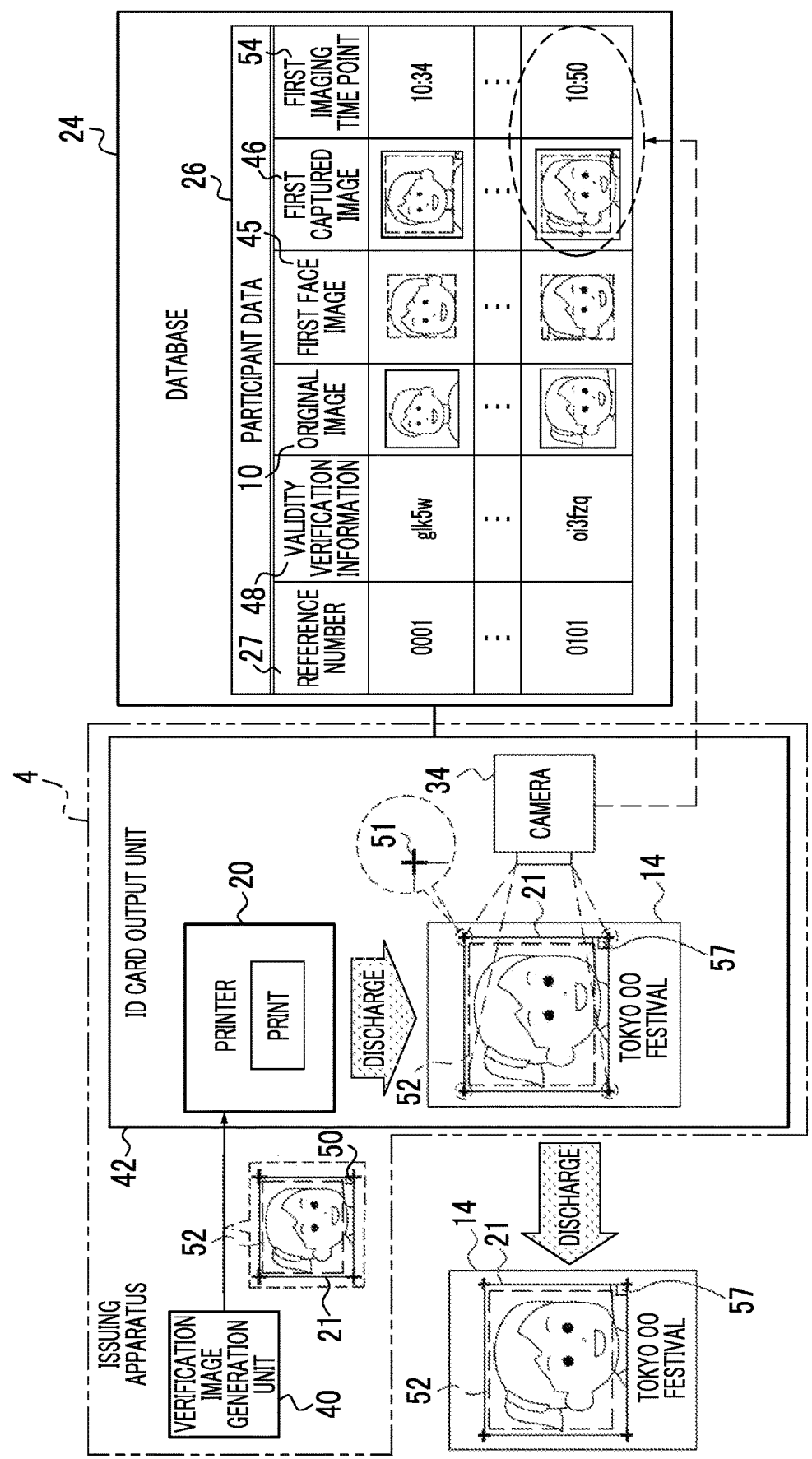
FIG. 5 is a descriptive diagram for describing an example of processing performed by an ID card output unit.

As illustrated in FIG. 5 as an example, the ID card output unit 42 controls the printer 20 incorporated in the issuing apparatus 4 to print the verification image 21 input from the verification image generation unit 40. The printer 20 prints the verification image 21 on the instant film 15 under control of the ID card output unit 42. The printed instant film 15 is discharged from the printer 20.

Here, a part corresponding to the authenticity collation pattern 50 in the verification image 21 printed on the instant film 15 will be referred to as an authenticity collation image 57 for distinction from the authenticity collation pattern 50. The authenticity collation image 57 is an image showing a part of the first captured image 46 and is an image obtained by printing the authenticity collation pattern 50 included in the verification image 21 via the printer 20. That is, the authenticity collation pattern 50 is image data constituting a part of the verification image 21 in a case where the verification image 21 is present as image data. The authenticity collation image 57 is an image that is printed on the instant film 15 and that constitutes a part of the verification image 21 as a printed image. In the embodiment of the disclosed technology, authenticity of the ID card 14 is verified using a change in density characteristic of the authenticity collation image 57 for each printing. Meanwhile, the authenticity collation pattern 50 is image data and thus, does not have a change in density characteristic for each printing. Since there is a difference between the authenticity collation image 57 as a printed image and the authenticity collation pattern 50 as image data, distinction therebetween is necessary for describing a principle of the verification of the authenticity. Thus, here, both will be described in a distinguished manner.

In the issuing apparatus 4, the verification image 21 of the discharged instant film 15 is disposed within an imaging range of the camera 34. Disposition of the instant film 15 may be automatically performed or may be performed by a hand of a person such as staff. Examples of automatic disposition include a method of installing the camera 34 such that the instant film 15 discharged from the printer 20 falls within the imaging range, or a method of transporting the discharged instant film 15 to a position of the camera 34 via a transport mechanism.

The ID card output unit 42 controls the camera 34 to capture the verification image 21 printed on the instant film 15. Specifically, the ID card output unit 42 images the instant film 15 by operating the camera 34 and detects the area marks 51 disposed at four corners of the verification image 21 from the image obtained by imaging. The ID card output unit 42 cuts out a region surrounded by the area marks 51 from the image obtained by imaging and acquires the cut-out image as the first captured image 46. As described above, in the verification image 21, the region surrounded by the four area marks 51 includes the electronic watermark 52 and the authenticity collation image 57 corresponding to the authenticity collation pattern 50. Thus, the electronic watermark 52 and the authenticity collation image 57 are also included in the first captured image 46 (refer also to FIG. 6).

The ID card output unit 42 stores the acquired first captured image 46 and a first imaging time point 54 that is a time point when the instant film 15 is imaged by the camera 34, in the database 24 in association with the reference number 27, the validity verification information 48, the original image 10, and the first face image 45. After imaging by the camera 34, the instant film 15 on which the verification image 21 is printed is discharged to an outside from the issuing apparatus 4 as the ID card 14.

Figure 6:
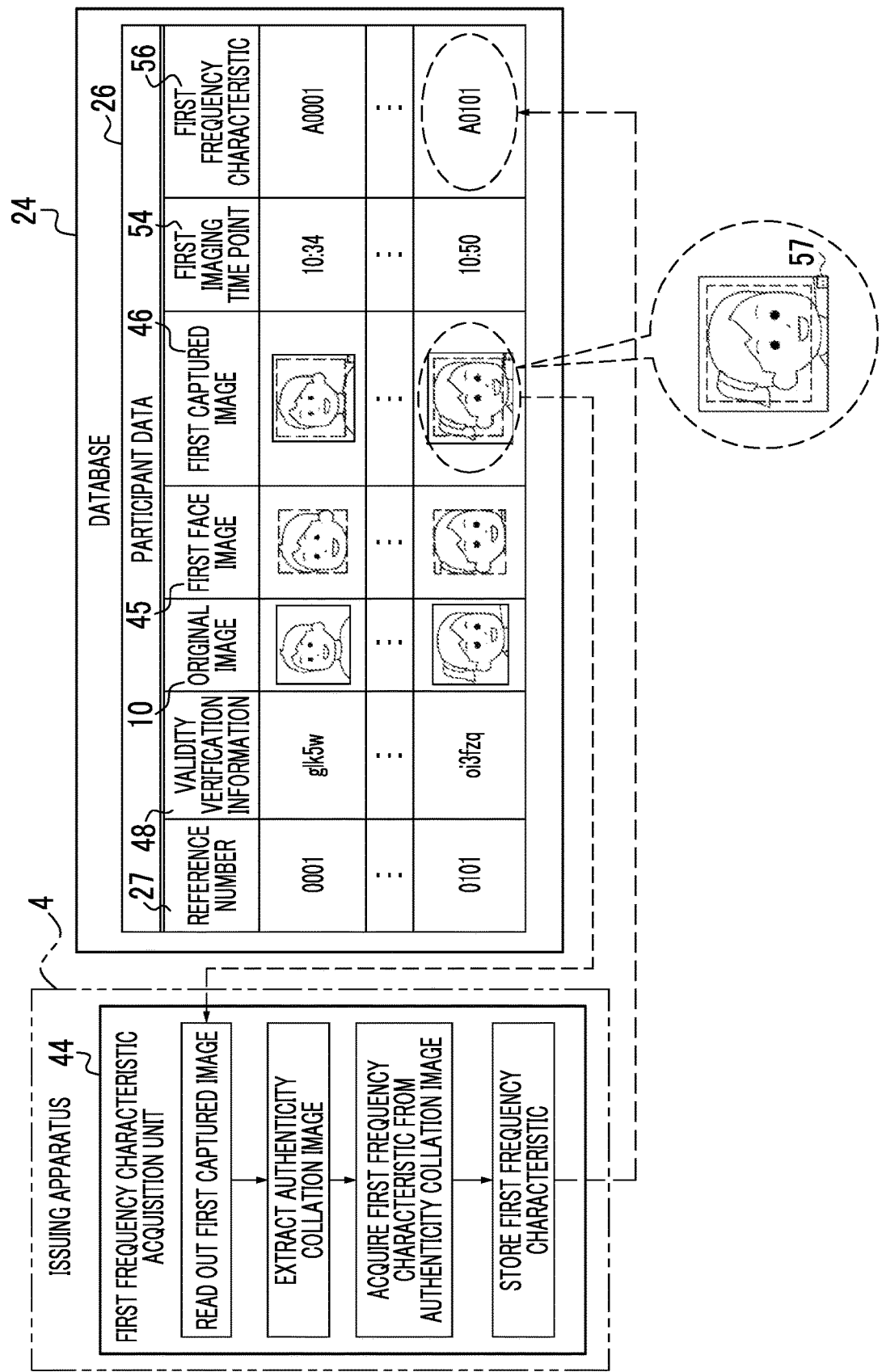
FIG. 6 is a descriptive diagram for describing an example of processing performed by a first frequency characteristic acquisition unit.

As illustrated in FIG. 6 as an example, the first frequency characteristic acquisition unit 44 reads out the first captured image 46 from the database 24 and extracts the authenticity collation image 57 positioned at a lower right corner of the read-out first captured image 46. A recording position of the authenticity collation image 57 is specified by detecting the area mark 51 at the lower right corner. The authenticity collation image 57 is used in authenticity verification processing, described later. The authenticity collation image 57 is an example of a "collation part" according to the embodiment of the disclosed technology.

The first frequency characteristic acquisition unit 44 acquires a first frequency characteristic 56 from the extracted authenticity collation image 57. The first frequency characteristic 56 is a frequency characteristic indicating a density characteristic in the authenticity collation image 57. In a case where the image is recorded on a recording medium, there is uncertainty of the color optical density. The uncertainty of the color optical density refers to variation in a state of occurrence of density unevenness for each printing even in a case where the same image is printed on recording media of the same type. For example, even in a case where a plain solid pattern of one color is recorded on recording media of the same type, the density unevenness occurs in the printed images. In the embodiment of the disclosed technology, the authenticity of the ID card 14 is verified using such uncertainty of the color optical density.

One reason why the uncertainty of the color optical density occurs in the instant film 15 is that a distribution of the developer applied onto a recording surface in a development process is not even in the entire region of the recording surface. Another reason is that a distribution of the photosensitive material that is a coloring material developing color is also not even in the entire region of the recording surface. Unevenness of the developer, the photosensitive material, and the like on the recording surface occurs even in one instant film 15.

Figure 7:
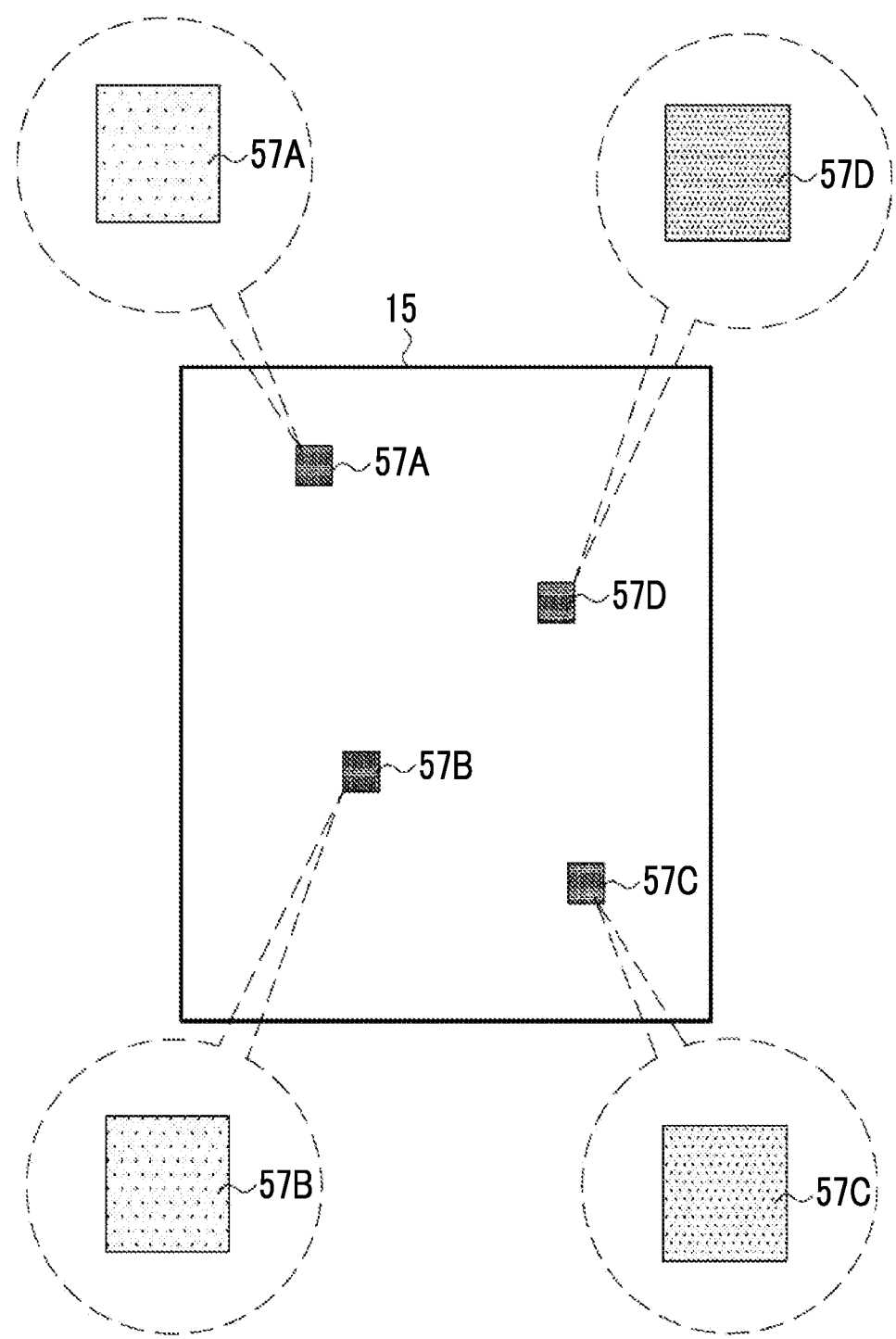
FIG. 7 is a top view illustrating an example of an instant film in which authenticity collation images are provided at four locations.
Figure 8:
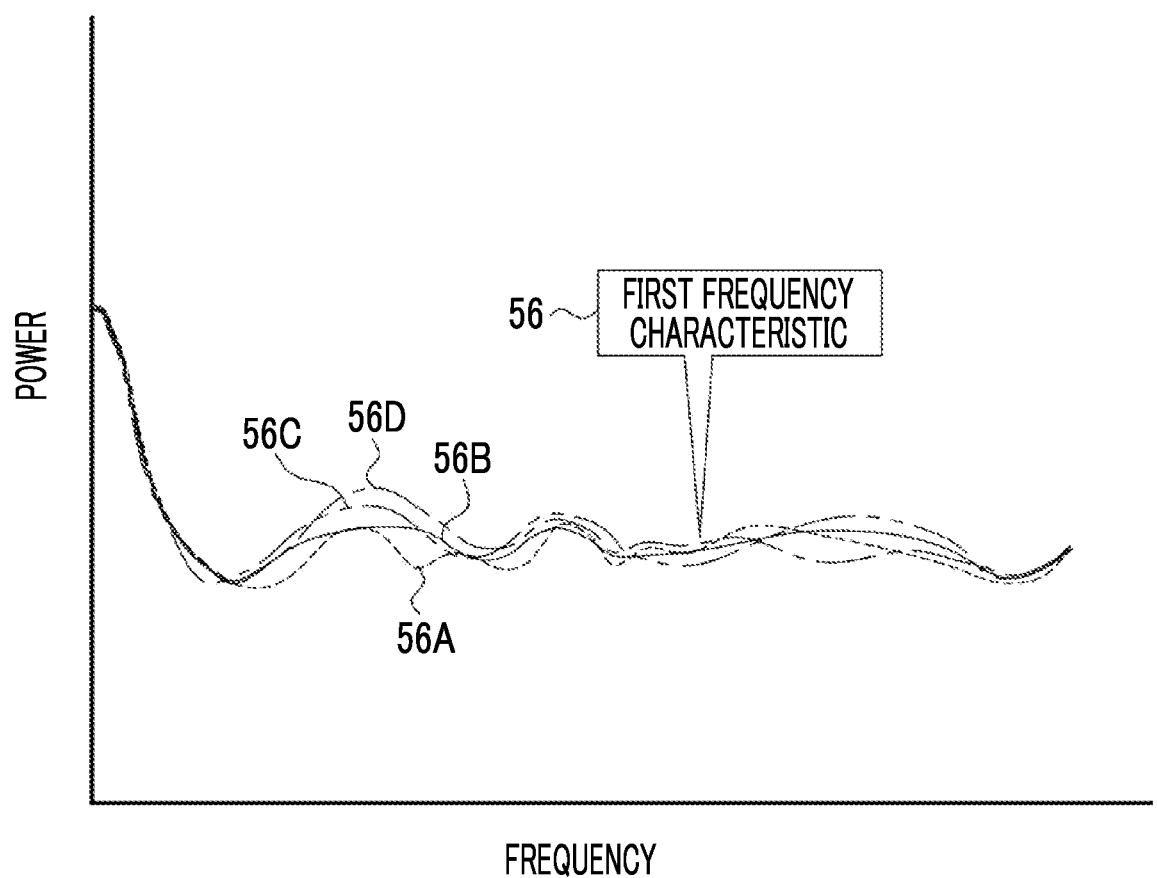
FIG. 8 is a graph showing an example of a first frequency characteristic indicating a density characteristic of each of the four authenticity collation images.

Thus, as illustrated in FIG. 7, even in a case where authenticity collation images 57A, 57B, 57C, and 57D are provided at four locations in the instant film 15 based on one authenticity collation pattern 50, the four authenticity collation images 57A, 57B, 57C, and 57D show different density characteristics. The graph shown in FIG. 8 is a graph of first frequency characteristics 56A, 56B, 56C, and 56D showing the density characteristics of the four authenticity collation images 57A, 57B, 57C, and 57D, respectively. The first frequency characteristics 56A, 56B, 56C, and 56D are derived by performing Fourier analysis on the authenticity collation images 57A, 57B, 57C, and 57D, respectively. In FIG. 8, a horizontal axis denotes a frequency, and a vertical axis denotes power. The first frequency characteristics 56A, 56B, 56C, and 56D are frequency spectra showing a degree to which density unevenness occurs for each frequency. While a tendency of relatively more density unevenness in a low-frequency region and relatively less density unevenness in a high-frequency region as a whole is shown, the four first frequency characteristics 56A, 56B, 56C, and 56D are slightly different from each other.

Even in one instant film 15, there is a difference in the density characteristic depending on a location. Thus, in a case where different instant films 15 are used, the density characteristics between the same authenticity collation images 57 printed at the same location also change. Thus, for example, even in a case where the ID card 14 is forged by printing the same face image on the instant film 15, it is possible to identify whether the ID card 14 is authentic or is forged using the authenticity collation image 57.

In the embodiment of the disclosed technology, even in a case where the same image is printed on the recording media of the same type, the authenticity of the ID card 14 is verified using the uncertainty of the color optical density that is variation in the state of occurrence of the density unevenness for each printing. The state of occurrence of the density unevenness appears as a frequency characteristic of the color optical density of the image. Thus, in the embodiment of the disclosed technology, even in a case where the same image is printed on the recording media of the same time, the authenticity of the ID card 14 is verified using variation in the frequency characteristic of the color optical density of the image for each printing.

Figure 9:
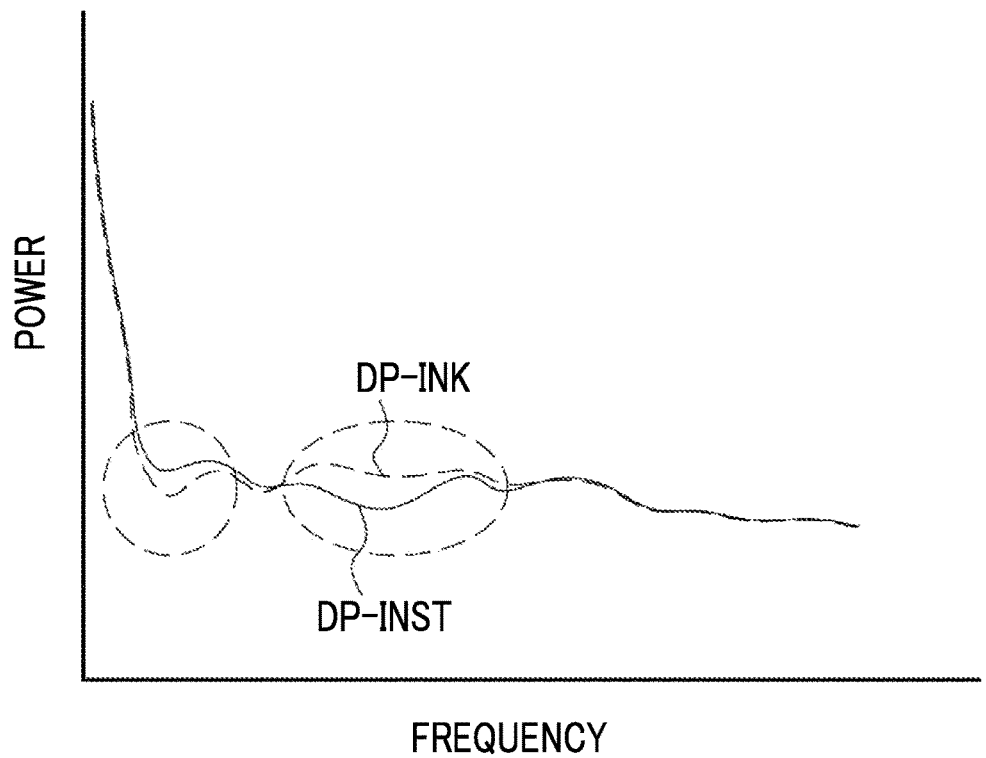
FIG. 9 is a graph showing an example of comparison between a frequency characteristic of an instant method and a frequency characteristic of an ink jet method.
Figure 10:
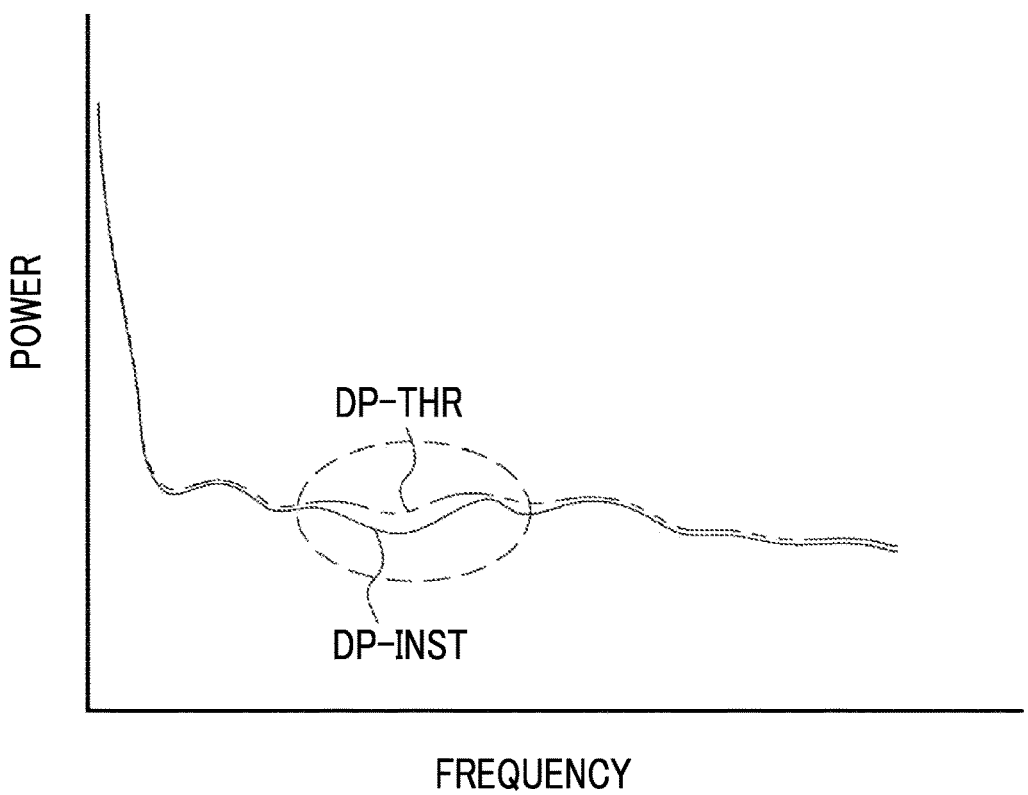
FIG. 10 is a graph showing an example of comparison between the frequency characteristic of the instant method and a frequency characteristic of a sublimation-type thermal transfer method.

In addition, in a case where different printing methods are used, the difference in the density characteristic is more remarkable. FIG. 9 and FIG. 10 are graphs showing the difference in the density characteristic caused by a difference in the printing method. FIG. 9 shows a frequency characteristic DP-INST of an instant method using the instant film 15 and a frequency characteristic DP-INK of an ink jet method of recording the image by ejecting ink to plain paper. As illustrated in FIG. 9, in a case where both are compared with each other, the frequency characteristic DP-INST of the instant method has more density unevenness in the low-frequency region and less density unevenness in the high-frequency region than the frequency characteristic DP-INK of the ink jet method. While the instant method is the density modulation method, the ink jet method is an area modulation method of changing gradation based on a density of dots. As illustrated in FIG. 9, the ink jet method having relatively more density unevenness in the high-frequency region indicates that the image recorded using the ink jet method has relatively stronger roughness.

In addition, FIG. 10 is a graph showing the frequency characteristic DP-INST of the instant method and a frequency characteristic DP-THR of a sublimation-type thermal transfer method. The sublimation-type thermal transfer method is a method of transferring melted ink to, for example, dedicated coated paper coated with polyester-based resin by heating dye sublimation ink with which an ink ribbon is coated via a thermal head. Both of the instant method and the sublimation-type thermal transfer method are density modulation methods. However, as illustrated in FIG. 10, there is a difference between the density characteristics of both. The sublimation-type thermal transfer method has more density unevenness in a frequency region surrounded by a circle of a broken line than the instant method.

The first frequency characteristic acquisition unit 44 acquires the state of occurrence of the density unevenness in the authenticity collation image 57 as the first frequency characteristic 56 and stores the acquired first frequency characteristic 56 in the database 24 in association with the first captured image 46. The acquired first frequency characteristic 56 shows a unique waveform for each instant film 15. The first frequency characteristic 56 is used in the authenticity verification processing, described later.

Figure 11:
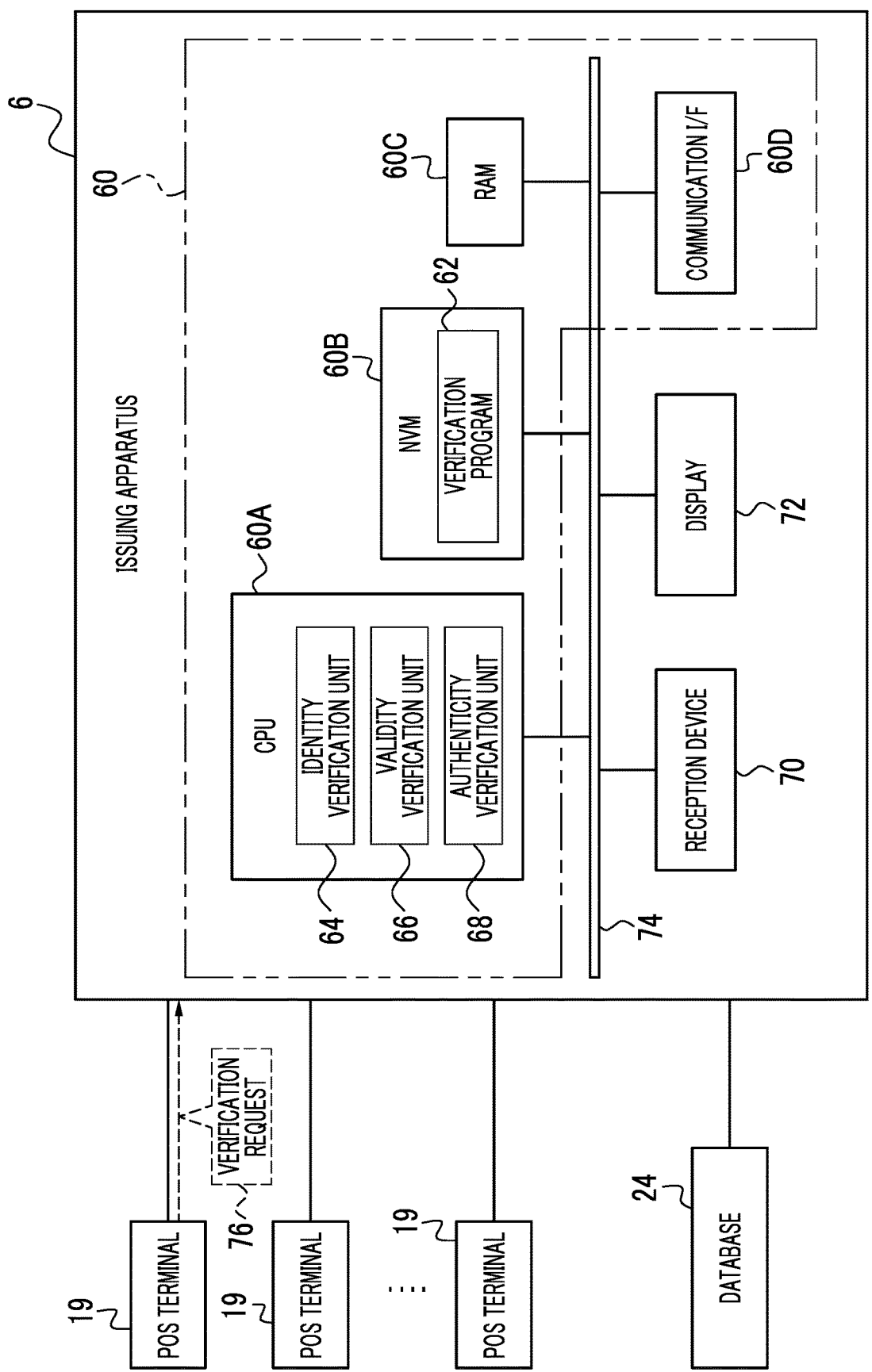
FIG. 11 is a block diagram of a verification apparatus.

As illustrated in FIG. 11 as an example, the verification apparatus 6 comprises a computer 60, a reception device 70, and a display 72. The computer 60 includes a CPU 60A, a NVM 60B, a RAM 60C, and a communication I/F 60D. The CPU 60A, the NVM 60B, the RAM 60C, the communication I/F 60D, the reception device 70, and the display 72 are connected to each other through a bus 74.

The CPU 60A controls the entire verification apparatus 6. The NVM 60B is a non-volatile memory. Here, an EEPROM is employed as an example of the NVM 60B. However, the disclosed technology is not limited thereto. A flash memory or the like may be employed, or a combination of a plurality of non-volatile memories may be employed. The RAM 60C is a volatile memory. The RAM 60C is used as a work memory by the CPU 60A.

The communication I/F 60D is implemented by, for example, a device including a FPGA. The communication I/F 60D is connected to the database 24 in a wired manner and exchanges various types of information between the CPU 60A and the database 24. In addition, the communication I/F 60D is connected to a plurality of the POS terminals 19 through a LAN cable or the like and exchanges various types of information between the CPU 60A and the POS terminals 19.

The reception device 70 includes a keyboard and a mouse. The keyboard and the mouse receive instructions for the verification apparatus 6 in accordance with operation of staff. The display 72 is used for displaying various types of information under control of the CPU 60A.

The NVM 60B stores a verification program 62. The CPU 60A operates as an identity verification unit 64, a validity verification unit 66, and an authenticity verification unit 68 by reading out the verification program 62 from the NVM 60B and by executing the read-out verification program 62 on the RAM 60C. The identity verification unit 64, the validity verification unit 66, and the authenticity verification unit 68 perform the verification processing in cooperation with each other. The verification processing is processing executed in a case where the verification apparatus 6 receives the verification request 76 from at least one of the plurality of POS terminals 19. The identity verification unit 64, the validity verification unit 66, and the authenticity verification unit 68 are an example of a "second processor" according to the embodiment of the disclosed technology.

Hereinafter, an example of the verification processing performed by the verification apparatus 6 will be specifically described with reference to FIG. 12 to FIG. 17.

Figure 12:
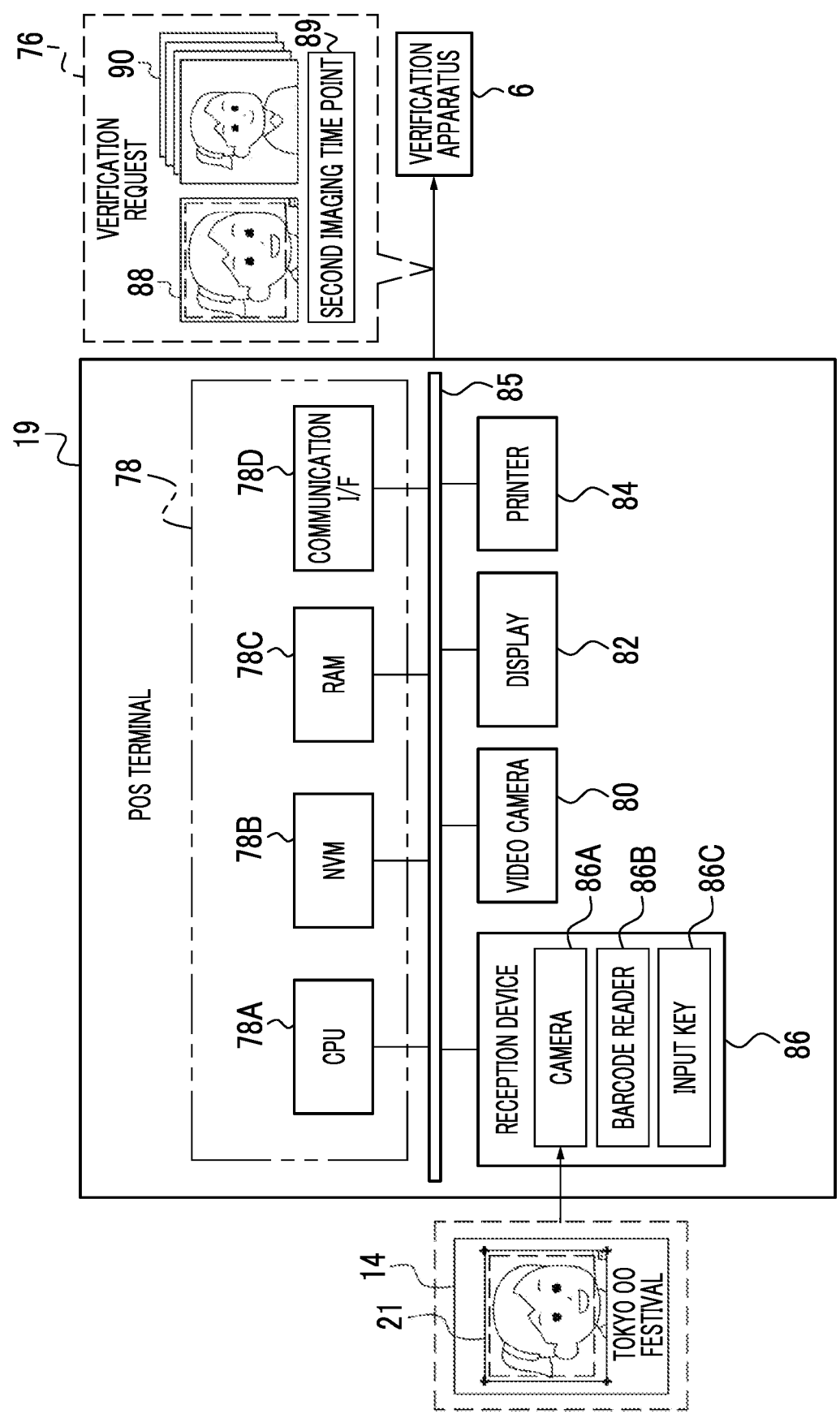
FIG. 12 is a block diagram of a POS terminal.

As illustrated in FIG. 12 as an example, the POS terminal 19 includes a computer 78, a reception device 86, a video camera 80, a display 82, and a printer 84. The computer 78 includes a CPU 78A, a NVM 78B, a RAM 78C, and a communication I/F 78D. The CPU 78A, the NVM 78B, the RAM 78C, the communication I/F 78D, the reception device 86, the video camera 80, the display 82, and the printer 84 are connected to each other through a bus 85.

The CPU 78A controls the entire POS terminal 19. The NVM 78B is a non-volatile memory. Here, an EEPROM is employed as an example of the NVM 78B. However, the disclosed technology is not limited thereto. A flash memory or the like may be employed, or a combination of a plurality of non-volatile memories may be employed. The NVM 78B stores not only various programs but also sales data processed by the POS terminal 19. The RAM 78C is a volatile memory. The RAM 78C is used as a work memory by the CPU 78A. The communication I/F 78D exchanges various types of information between the CPU 78A and the verification apparatus 6.

The reception device 86 includes a camera 86A, a barcode reader 86B, and an input key 86C. The camera 86A has the same imaging performance, that is, lens performance, filter performance, and imaging element performance, as the camera 34 incorporated in the issuing apparatus 4. The camera 86A captures the verification image 21 included in the ID card 14 to be verified. The barcode reader 86B scans a barcode attached in advance to each product. The barcode includes information related to a product name, a price, and the like of each product. The input key 86C is a key including a numeric keypad with which information and the like related to each product can be manually input into the POS terminal 19. The camera 86A is an example of the "camera" according to the embodiment of the disclosed technology.

The display 82 is used for presenting a purchase amount to the participant 11 under control of the CPU 78A. The printer 84 prints a receipt showing content of purchase.

In a case where the participant 11, for example, shops at the store 16, the cashier 17 of the store 16 scans the barcode attached to a product to be purchased by the participant 11 via the barcode reader 86B. The CPU 78A calculates the purchase amount based on product information included in the barcode scanned by the barcode reader 86B.

The participant 11 presents the ID card 14 of the participant 11, that is, the ID card 14 to be verified, to the cashier 17 at checkout in the store 16. In a case where the cashier 17 brings the presented ID card 14 close to the camera 86A, the camera 86A captures the verification image 21 included in the ID card 14 to be verified under control of the CPU 78A. The CPU 78A detects the area marks 51 disposed at the four corners of the verification image 21 from the image obtained by imaging by the camera 86A and cuts out and acquires the region surrounded by the area marks 51 as a second captured image 88. In addition, the video camera 80 acquires a video image 90 including frame images of several tens of frames by imaging the participant 11 present in front of the POS terminal 19 for one to several seconds under control of the CPU 78A. The POS terminal 19 transmits the verification request 76 including the second captured image 88, the video image 90, and a second imaging time point 89 indicating a time point when the camera 86A captures the verification image 21 included in the ID card 14 to the verification apparatus 6. The second captured image 88 is an example of a "second captured image" according to the embodiment of the disclosed technology.

Figure 13:
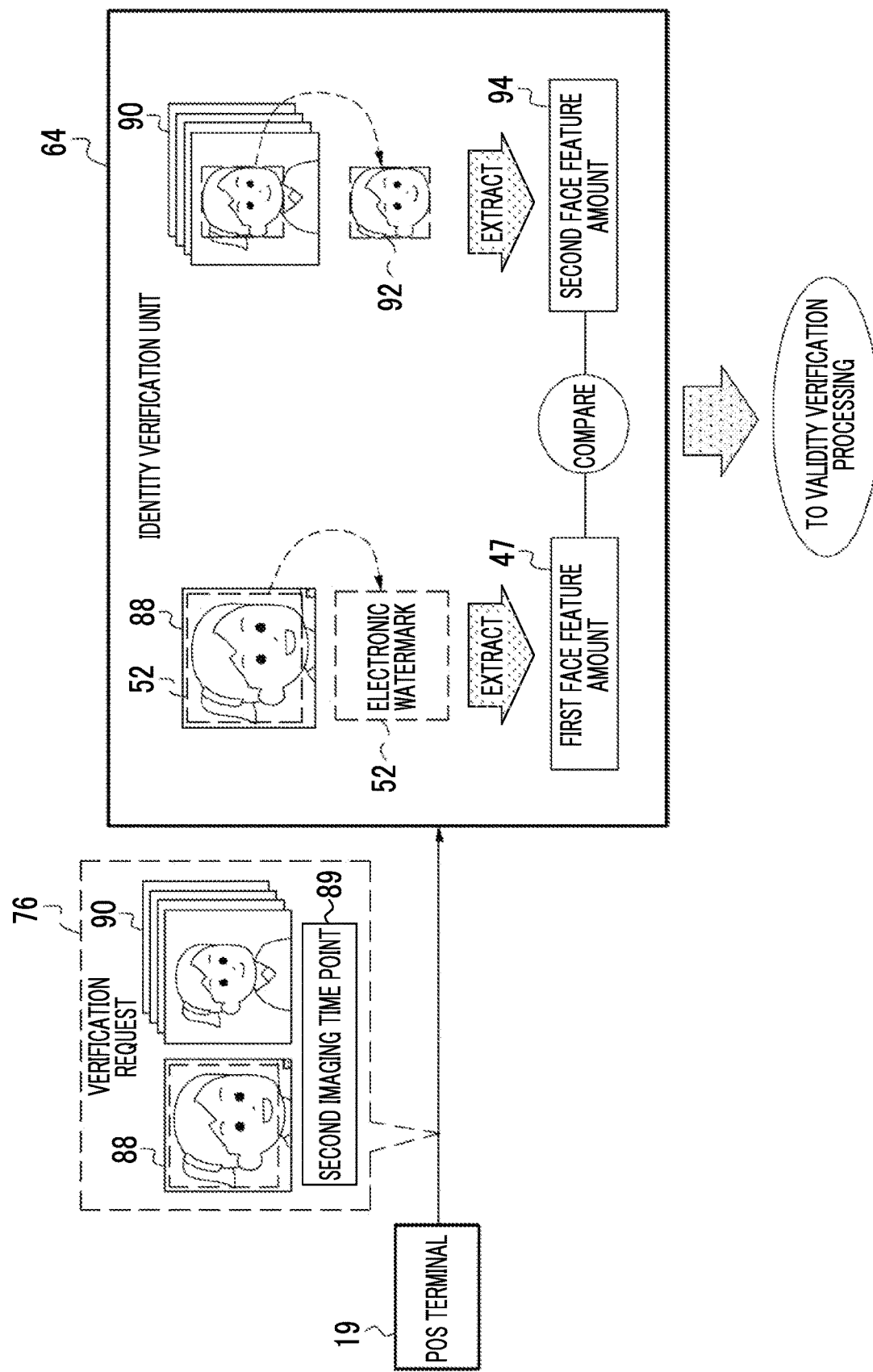
FIG. 13 is a descriptive diagram illustrating an example of identity verification processing performed by an identity verification unit.

As illustrated in FIG. 13 as an example, the identity verification unit 64 performs the identity verification processing in a case where the verification request 76 is received from the POS terminal 19. Specifically, the identity verification unit 64 acquires the second captured image 88 included in the verification request 76. The identity verification unit 64 extracts the first face feature amount 47 embedded in the verification image 21 as the electronic watermark 52 from the second captured image 88 by performing specific operation processing on the acquired second captured image 88.

The identity verification unit 64 extracts a second face image 92 showing a face of a person from the frame images included in the video image 90. As a method of extracting the second face image 92, the same well-known face recognition technology as the method of extracting the first face image 45 can be used. For example, the identity verification unit 64 extracts, as the second face image 92, a face of a person initially extracted among faces of the person extracted from a plurality of frame images included in the video image 90. The identity verification unit 64 extracts a second face feature amount 94 from the extracted second face image 92. The second face feature amount 94 is the same as the first face feature amount 47 and can be extracted using the same well-known feature amount extraction technology as the first face feature amount 47.

The identity verification unit 64 compares the first face feature amount 47 extracted from the second captured image 88 with the second face feature amount 94 extracted from the second face image 92 included in the video image 90. In a case where a difference between the first face feature amount 47 and the second face feature amount 94 is within a predetermined range, the identity verification unit 64 determines that a person captured in the verification image 21 of the ID card 14 to be verified and the person present in front of the POS terminal 19 are the same person. In this case, the identity verification unit 64 outputs a signal (hereinafter, referred to as an identity verification completion signal) indicating that identity verification is completed to the validity verification unit 66. The second face image 92 is an example of a "second face image" according to the embodiment of the disclosed technology. The first face feature amount 47 is an example of a "feature amount of a face extracted from the first face image" according to the embodiment of the disclosed technology. The second face feature amount 94 is an example of a "feature amount of a face extracted from the second face image" according to the embodiment of the disclosed technology.

Figure 14:
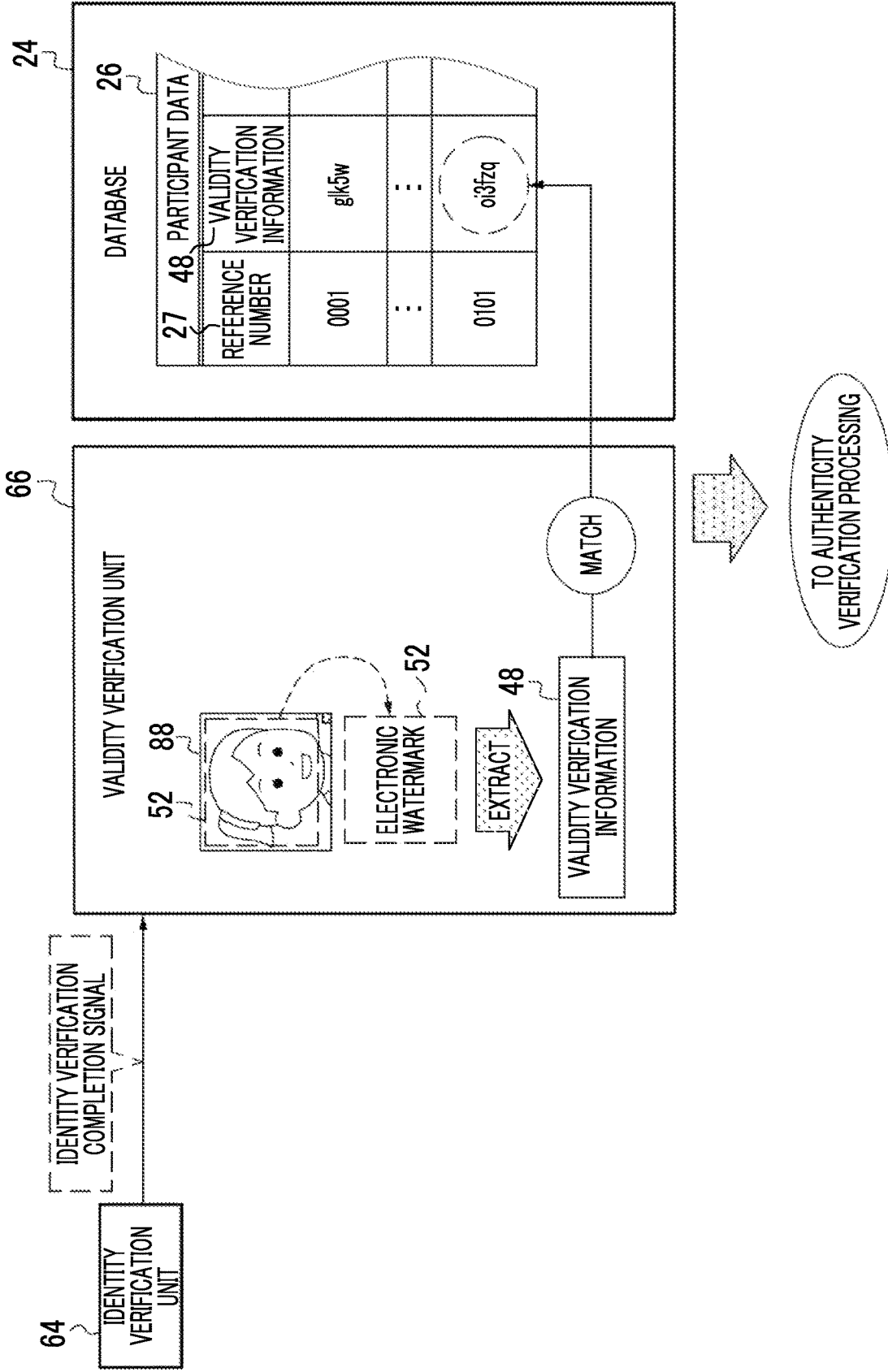
FIG. 14 is a descriptive diagram for describing an example of validity verification processing performed by a validity verification unit.

As illustrated in FIG. 14 as an example, the validity verification unit 66 performs the validity verification processing in a case where the identity verification completion signal is received from the identity verification unit 64. Specifically, the validity verification unit 66 extracts the validity verification information 48 embedded in the verification image 21 as the electronic watermark 52 from the second captured image 88 by performing specific operation processing on the second captured image 88. The validity verification unit 66 searches for the presence of the validity verification information 48 matching the validity verification information 48 extracted from the second captured image 88 in the participant data 26 stored in the database 24. In a case where the validity verification information 48 matching the validity verification information 48 extracted from the second captured image 88 is present in the participant data 26, the validity verification unit 66 determines that the ID card 14 is a card having valid access permission to the verification system 2. In this case, the validity verification unit 66 outputs a signal (hereinafter, referred to as a "validity verification completion signal") indicating that validity verification is completed to the authenticity verification unit 68.

Figure 15:
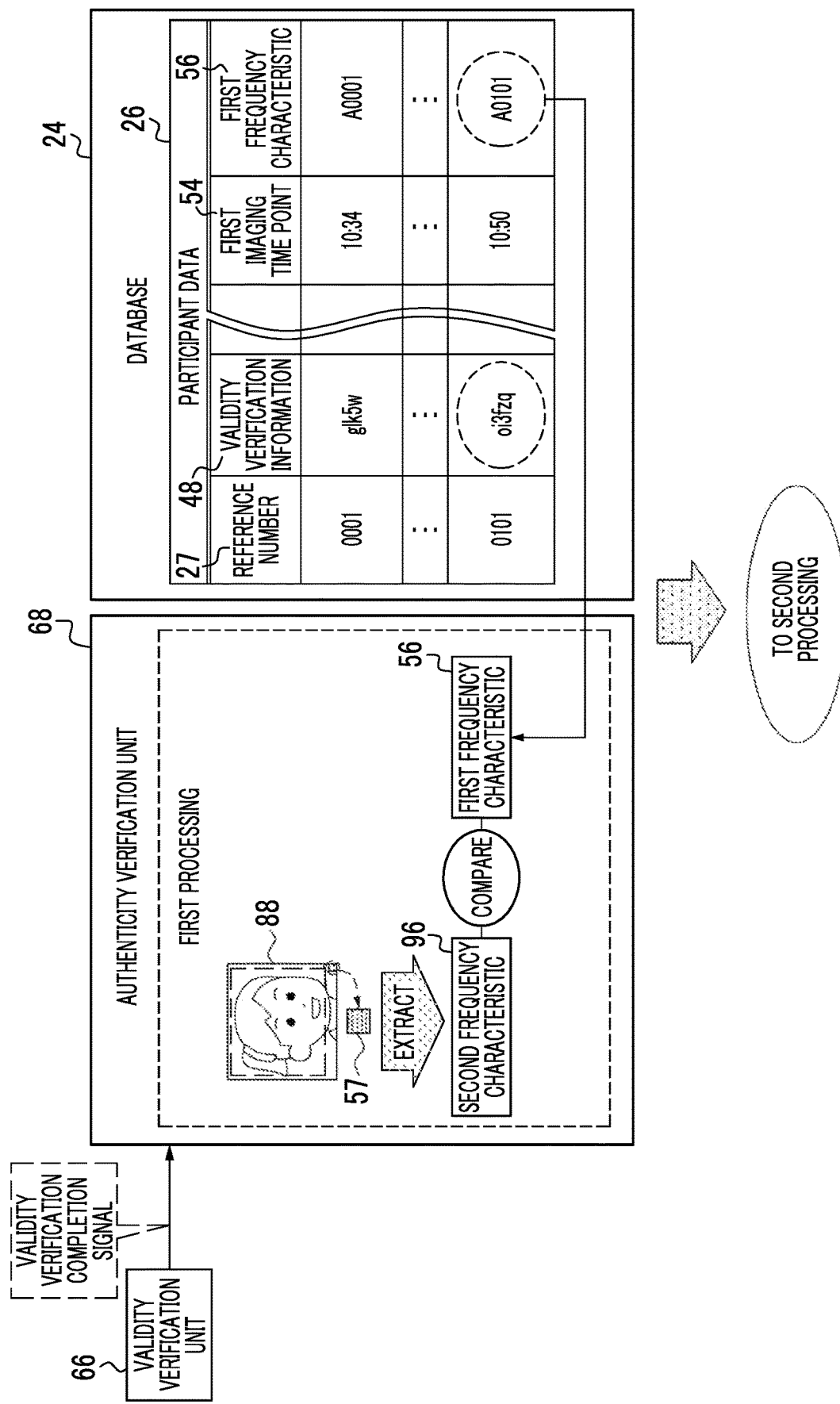
FIG. 15 is a descriptive diagram illustrating an example of first processing of authenticity verification processing performed by an authenticity verification unit.

As illustrated in FIG. 15 as an example, the authenticity verification unit 68 performs the authenticity verification processing in a case where the validity verification completion signal is received from the validity verification unit 66. The authenticity verification processing includes first processing of verifying the authenticity using the uncertainty of the color optical density of the authenticity collation image 57, and second processing of verifying the authenticity using a change in time of the color optical density of the authenticity collation image 57. First, in the first processing, the authenticity verification unit 68 acquires the second captured image 88 included in the verification request 76. For example, the authenticity verification unit 68 extracts the authenticity collation image 57 from the acquired second captured image 88 using pattern matching. The authenticity verification unit 68 acquires a color optical density characteristic, that is, a second frequency characteristic 96 indicating the density unevenness, in the authenticity collation image 57 by optically scanning the extracted authenticity collation image 57.

The authenticity verification unit 68 reads out, from the database 24, the first frequency characteristic 56 stored in the participant data 26 in association with the validity verification information 48 searched by the validity verification unit 66 in the validity verification processing illustrated in FIG. 14. That is, in the example illustrated in FIG. 15, the authenticity verification unit 68 reads out, from the database 24, the first frequency characteristic 56 of "A0101" stored in the participant data 26 in association with the validity verification information 48 of "oi3fzq" searched by the validity verification unit 66. The authenticity verification unit 68 compares the first frequency characteristic 56 read out from the database 24 with the second frequency characteristic 96 of the authenticity collation image 57 extracted from the second captured image 88. In a case where a difference between the first frequency characteristic 56 and the second frequency characteristic 96 is within a predetermined range, the authenticity verification unit 68 executes the second processing.

Figure 16:
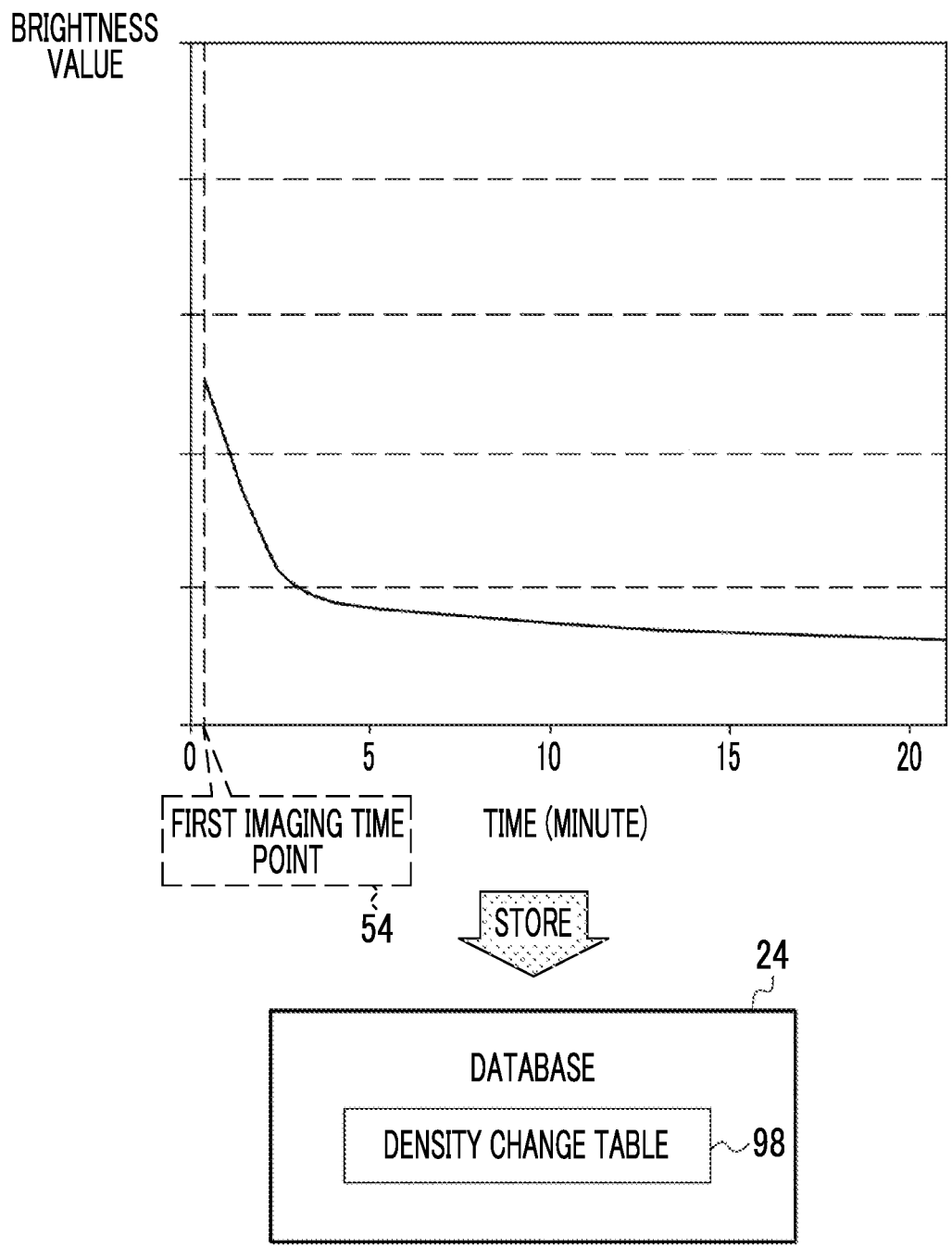
FIG. 16 is a graph showing an example of a change in time of a color optical density in an authenticity collation image.

In the second processing, the authenticity verification unit 68 verifies the authenticity by taking into consideration a change in time of the color optical density of the authenticity collation image 57 and then, by comparing the color optical density characteristics. As illustrated in FIG. 16 as an example, the image printed on the instant film 15 is known to have a change in the color optical density as time elapses. A characteristic of the change in time of the color optical density varies for each color. The graph shown in FIG. 16 shows, for example, a change in time of the color optical density of the authenticity collation image 57 from the first imaging time point 54. In FIG. 16, zero minutes indicate a time point when the verification image 21 is printed on the instant film 15 by the printer 20. The first imaging time point 54 indicates a time point when the verification image 21 printed on the instant film 15 is captured by the camera 34. The first imaging time point 54 is a time point after an elapse of several seconds to several tens of seconds from the time point when the verification image 21 is printed on the instant film 15.

In FIG. 16, a vertical axis denotes a brightness value. As the brightness value is increased, the density is decreased. As the brightness value is decreased, the density is increased. As illustrated in FIG. 16, in the instant film 15, color development rapidly proceeds in a short time (approximately three minutes) immediately after printing. Thus, an increase in the density (a decrease in the brightness value) in this period is rapid. Then, the increase in the density is smooth. Since a change in time of the color optical density of the instant film 15 shows the tendency in FIG. 16, the current color optical density of the instant film 15 can be predicted from an elapsed time after printing.

In the database 24, a density change table 98 indicating the change in time of the color optical density of the authenticity collation image 57 is stored in advance. Here, for example, the change in time of the color optical density is a value derived by experiment using an actual apparatus and/or by computer simulation or the like. An operation expression that takes an elapsed time from the first imaging time point 54 as an independent variable and takes the color optical density as a dependent variable may be used instead of the density change table 98.

Figure 17:
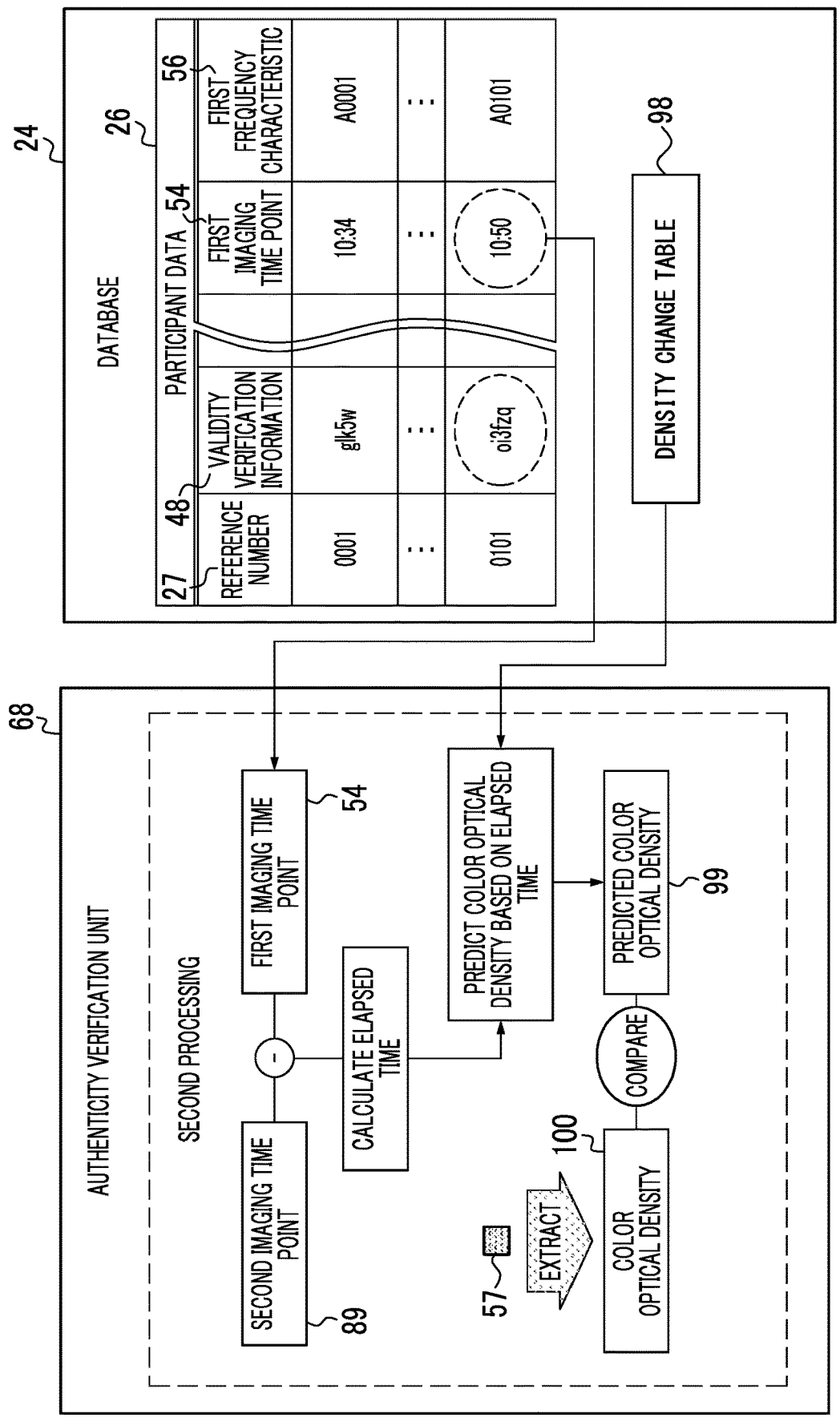
FIG. 17 is a descriptive diagram illustrating an example of second processing of the authenticity verification processing performed by the authenticity verification unit.

As illustrated in FIG. 17 as an example, in the second processing, the authenticity verification unit 68 reads out, from the database 24, the first imaging time point 54 stored in the participant data 26 in association with the validity verification information 48 searched by the validity verification unit 66 in the validity verification processing illustrated in FIG. 14. The authenticity verification unit 68 calculates an elapsed time from the first imaging time point 54 to the second imaging time point 89 by obtaining a difference between the second imaging time point 89 included in the verification request 76 and the first imaging time point 54. The authenticity verification unit 68 derives a predicted color optical density 99 that is a predicted value of the color optical density of the authenticity collation image 57, based on the elapsed time using the density change table 98.

The authenticity verification unit 68 measures a color optical density 100 of the authenticity collation image 57 extracted from the second captured image 88. The color optical density 100 is a brightness value of the authenticity collation image 57.

The authenticity verification unit 68 compares the color optical density 100 of the authenticity collation image 57 obtained by measurement with the predicted color optical density 99 derived using the density change table 98. In a case where a difference between the predicted color optical density 99 and the color optical density 100 is within a predetermined range, the authenticity verification unit 68 determines that the ID card 14 is not forged. In this case, the authenticity verification unit 68 transmits a verification signal indicating that the ID card 14 is verified to the POS terminal 19.

Figure 18:
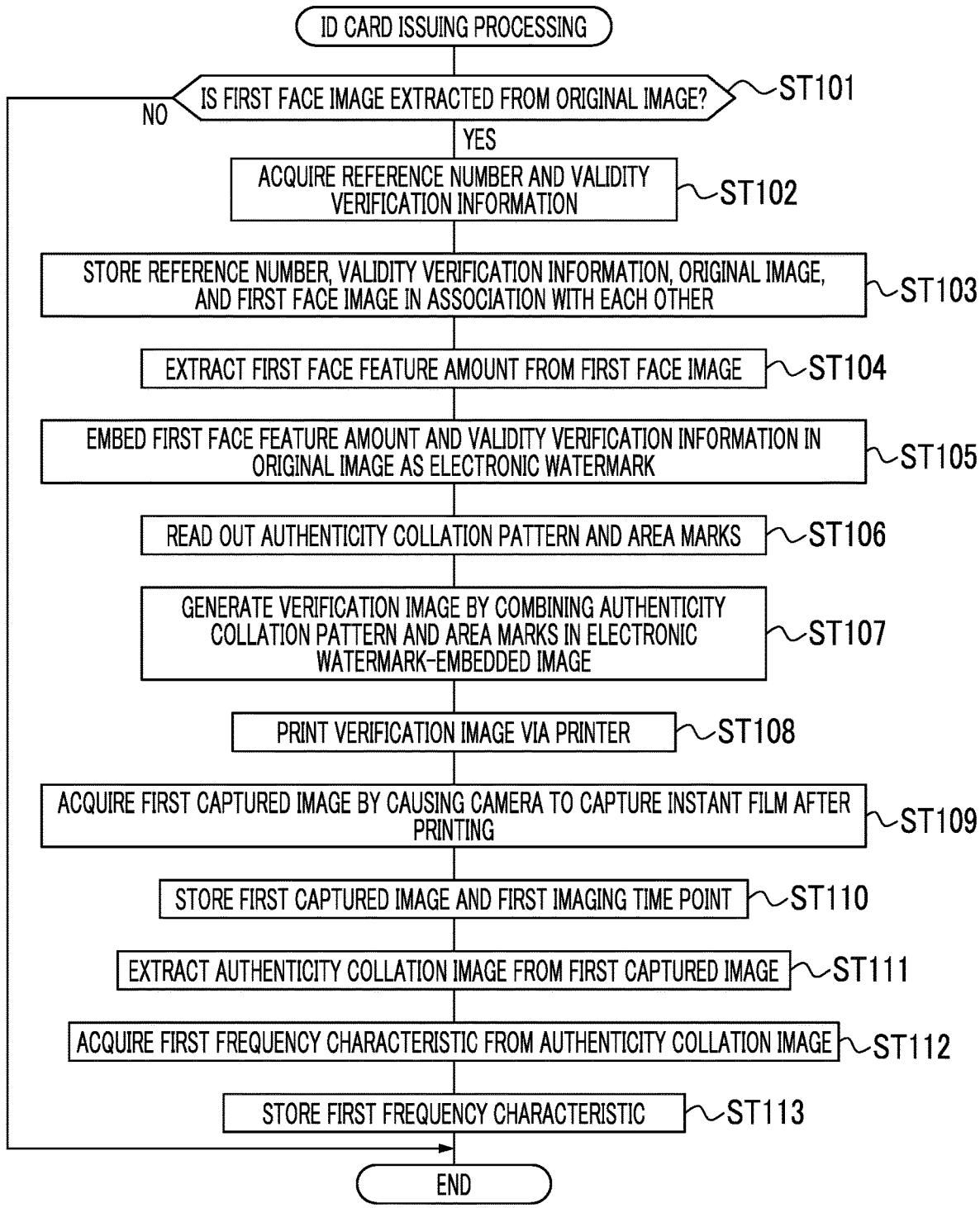
FIG. 18 is a flowchart illustrating an example of a flow of ID card issuing processing.

Next, action of the verification system 2 according to the present embodiment will be described with reference to FIG. 18 to FIG. 20. The ID card issuing processing illustrated in FIG. 18 is performed by causing the CPU 32A of the issuing apparatus 4 to execute the ID card issuing program 38. The verification processing illustrated in FIG. 19 and in FIG. 20 is performed by causing the CPU 60A of the verification apparatus 6 to execute the verification program 62.

The ID card issuing processing illustrated in FIG. 18 is started in a case where the verification image generation unit 40 receives the ID card issuing request 18 from the smart device 8. In the ID card issuing processing, first, the verification image generation unit 40 extracts the first face image 45 from the original image 10 included in the received ID card issuing request 18. In step ST101, the verification image generation unit 40 determines whether or not the first face image 45 is extracted from the original image 10. In step ST101, in a case where the first face image 45 is extracted, a positive determination is made, and the ID card issuing processing transitions to step ST102. In a case where the first face image 45 is not extracted, a negative determination is made, and the ID card issuing processing ends.

In step ST102, the verification image generation unit 40 acquires a new reference number 27 and the validity verification information 48 corresponding to the received ID card issuing request 18. Then, the ID card issuing processing transitions to step ST103.

In step ST103, the verification image generation unit 40 stores the acquired reference number 27 and the validity verification information 48, the original image 10, and the first face image 45 in the database 24 in association with each other. Then, the ID card issuing processing transitions to step ST104.

In step ST104, the verification image generation unit 40 extracts the first face feature amount 47 from the first face image 45. Then, the ID card issuing processing transitions to step ST105.

In step ST105, the verification image generation unit 40 generates the electronic watermark-embedded image 49 by embedding the extracted first face feature amount 47 and the acquired validity verification information 48 in the original image 10 as an electronic watermark. Then, the ID card issuing processing transitions to step ST106.

In step ST106, the verification image generation unit 40 reads out the authenticity collation pattern 50 and the area marks 51 from the database 24. Then, the ID card issuing processing transitions to step ST107.

In step ST107, the verification image generation unit 40 generates the verification image 21 by combining the read-out authenticity collation pattern 50 and the area marks 51 in the generated electronic watermark-embedded image 49. The verification image generation unit 40 outputs the generated verification image 21 to the printer 20. Then, the ID card issuing processing transitions to step ST108.

In step ST108, the ID card output unit 42 controls the printer 20 to print the verification image 21 input from the verification image generation unit 40. Accordingly, the printer 20 prints the verification image 21 on the instant film 15. Then, the ID card issuing processing transitions to step ST109.

In step ST109, the ID card output unit 42 controls the camera 34 to image the instant film 15 on which the verification image 21 is printed. Accordingly, the camera 34 captures the verification image 21 printed on the instant film 15, and the ID card output unit 42 acquires the image captured by the camera 34 as the first captured image 46. After imaging by the camera 34, the instant film 15 on which the verification image 21 is printed is discharged to the outside of the issuing apparatus 4 as the ID card 14. Then, the ID card issuing processing transitions to step ST110.

In step ST110, the ID card output unit 42 stores the acquired first captured image 46 and the first imaging time point 54 indicating a time when the first captured image 46 is captured, in the database 24 in association with the reference number 27, the validity verification information 48, the original image 10, and the first face image 45. Then, the ID card issuing processing transitions to step ST111.

In step ST111, the first frequency characteristic acquisition unit 44 extracts the authenticity collation image 57 positioned at the lower right corner of the first captured image 46 from the first captured image 46. Then, the ID card issuing processing transitions to step ST112.

In step ST112, the first frequency characteristic acquisition unit 44 acquires the first frequency characteristic 56 indicating the density unevenness in the authenticity collation image 57 from the extracted authenticity collation image 57. Then, the ID card issuing processing transitions to step ST113.

In step ST113, the first frequency characteristic acquisition unit 44 stores the acquired first frequency characteristic 56 in the database 24 in association with the first captured image 46. Then, the ID card issuing processing ends.

Figure 19:
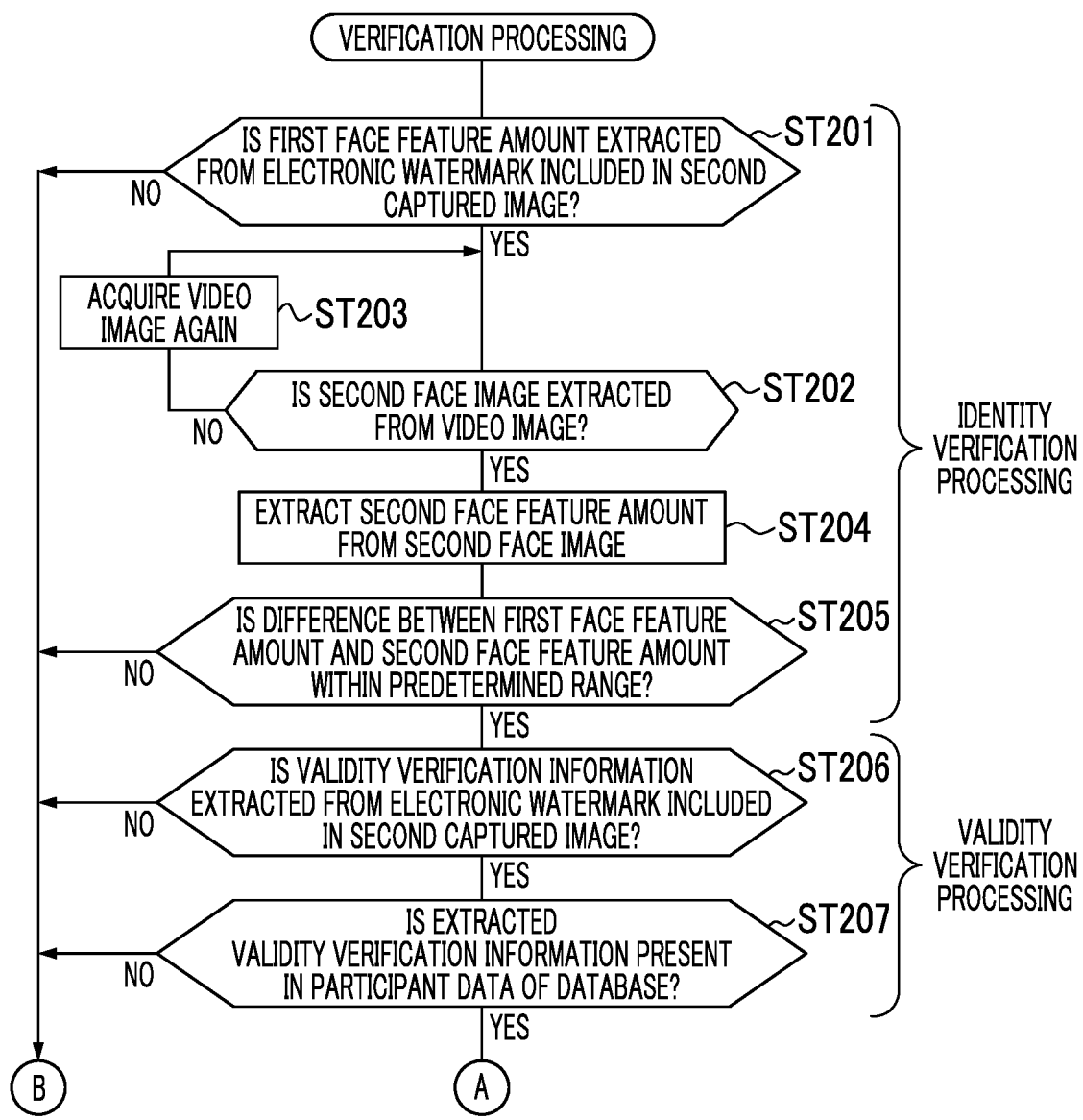
FIG. 19 is a flowchart illustrating an example of a flow of verification processing.
Figure 20:
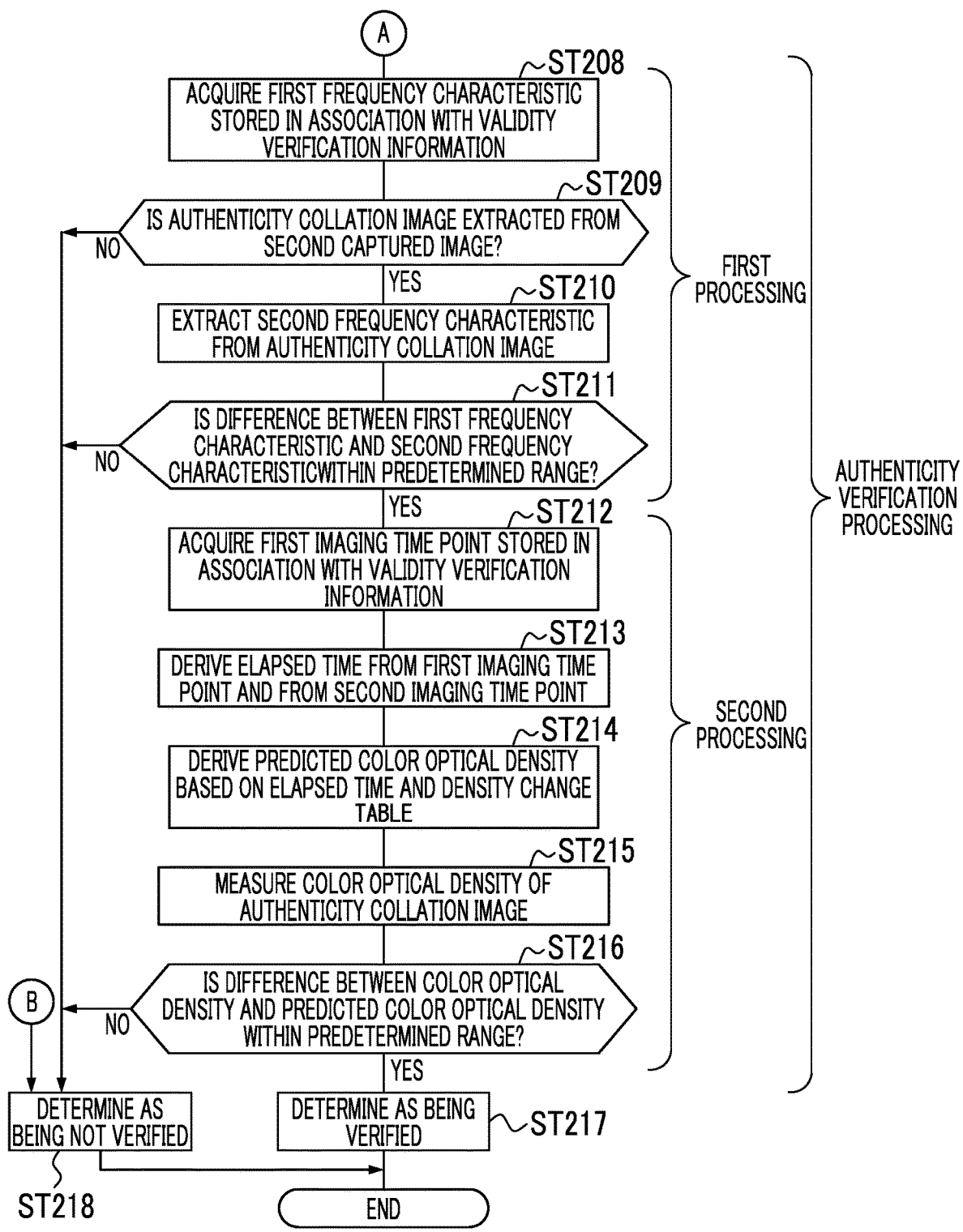
FIG. 20 is a flowchart illustrating an example of the flow of the verification processing.

The verification processing illustrated in FIG. 19 and in FIG. 20 is started in a case where the identity verification unit 64 receives the verification request 76 from the POS terminal 19. The verification processing includes the identity verification processing illustrated in steps ST201 to ST205, the validity verification processing illustrated in steps ST206 and ST207, and the authenticity verification processing illustrated in steps ST208 to ST216. In addition, the authenticity verification processing is broadly divided into the first processing illustrated in steps ST208 to ST211 and the second processing illustrated in steps ST212 to ST216.

In the identity verification processing, first, the identity verification unit 64 extracts the first face feature amount 47 embedded as the electronic watermark 52 from the second captured image 88 included in the received verification request 76. In step ST201, the identity verification unit 64 determines whether or not the first face feature amount 47 is extracted from the electronic watermark 52 included in the second captured image 88. In step ST201, in a case where the first face feature amount 47 is extracted, a positive determination is made, and the identity verification processing transitions to step ST202. In a case where the first face feature amount 47 is not extracted, a negative determination is made, and the verification processing transitions to step ST218.

The identity verification unit 64 extracts the second face image 92 from the video image 90 included in the verification request 76. In step ST202, the identity verification unit 64 determines whether or not the second face image 92 is extracted from the video image 90. Ins step ST202, in a case where the second face image 92 is extracted, a positive determination is made, and the identity verification processing transitions to step ST204. In a case where the second face image 92 is not extracted, a negative determination is made, and the identity verification processing transitions to step ST203.

In a case where the second face image 92 is not extracted from the video image 90, the identity verification unit 64 in step ST203 causes the CPU 78A of the POS terminal 19 to operate the video camera 80 and transmit the video image 90 obtained by imaging by the video camera 80 again. Then, the identity verification processing transitions to step ST202.

In a case where the second face image 92 is extracted from the video image 90, the identity verification unit 64 in step ST204 extracts the second face feature amount 94 from the second face image 92. Then, the identity verification processing transitions to step ST205.

In step ST205, the identity verification unit 64 determines whether or not the difference between the extracted first face feature amount 47 and the second face feature amount 94 is within the predetermined range. In step ST205, in a case where the difference between the first face feature amount 47 and the second face feature amount 94 is within the predetermined range, a positive determination is made, and the identity verification processing transitions to the validity verification processing illustrated in steps ST206 and ST207. In a case where the difference between the first face feature amount 47 and the second face feature amount 94 is not within the predetermined range, a negative determination is made, and the verification processing transitions to step ST218.

In the validity verification processing, first, the validity verification unit 66 extracts the validity verification information 48 from the electronic watermark 52 included in the second captured image 88. In step ST206, the validity verification unit 66 determines whether or not the validity verification information 48 is extracted from the electronic watermark 52 included in the second captured image 88. In step ST206, in a case where the validity verification information 48 is extracted, a positive determination is made, and the validity verification processing transitions to step ST207. In a case where the validity verification information 48 is not extracted, a negative determination is made, and the verification processing transitions to step ST218.

The validity verification unit 66 searches for the extracted validity verification information 48 in the participant data 26 of the database 24. In step ST207, the validity verification unit 66 determines whether or not the extracted validity verification information 48 is present in the participant data 26 of the database 24. In step ST207, in a case where the validity verification information 48 is present in the participant data 26, a positive determination is made, and the validity verification processing transitions to the authenticity verification processing illustrated in steps ST208 to ST216. In a case where the validity verification information 48 is not present in the participant data 26, a negative determination is made, and the verification processing transitions to step ST218.

In the first processing of the authenticity verification processing, first, in step ST208, the authenticity verification unit 68 acquires the first frequency characteristic 56 stored in the participant data 26 in association with the validity verification information 48 extracted in the validity verification processing. Then, the authenticity verification processing transitions to step ST209.

The authenticity verification unit 68 extracts the authenticity collation image 57 from the second captured image 88. In step ST209, the authenticity verification unit 68 determines whether or not the authenticity collation image 57 is extracted from the second captured image 88. In step ST209, in a case where the authenticity collation image 57 is extracted, a positive determination is made, and the authenticity verification processing transitions to step ST210. In a case where the authenticity collation image 57 is not extracted, a negative determination is made, and the verification processing transitions to step ST218.

In step ST210, the authenticity verification unit 68 extracts the second frequency characteristic 96 from the authenticity collation image 57. Then, the authenticity verification processing transitions to step ST211.

In step ST211, the authenticity verification unit 68 determines whether or not the difference between the first frequency characteristic 56 and the second frequency characteristic 96 is within the predetermined range. In step ST211, in a case where the difference between the first frequency characteristic 56 and the second frequency characteristic 96 is within the predetermined range, a positive determination is made, and the authenticity verification processing transitions to the second processing illustrated in steps ST212 to ST216. In a case where the difference between the first frequency characteristic 56 and the second frequency characteristic 96 is not within the predetermined range, a negative determination is made, and the verification processing transitions to step ST218.

In the second processing of the authenticity verification processing, first, in step ST212, the authenticity verification unit 68 acquires the first imaging time point 54 stored in the participant data 26 of the database 24 in association with the validity verification information 48 extracted in the validity verification processing. Then, the authenticity verification processing transitions to step ST213.

In step ST213, the authenticity verification unit 68 derives the elapsed time from the first imaging time point 54 to the second imaging time point 89 by obtaining the difference between the first imaging time point 54 acquired from the database 24 and the second imaging time point 89 included in the verification request 76. Then, the authenticity verification processing transitions to step ST214.

In step ST214, the authenticity verification unit 68 derives the predicted color optical density 99 based on the derived elapsed time and on the density change table 98 stored in the database 24. Then, the authenticity verification processing transitions to step ST215.

In step ST215, the authenticity verification unit 68 measures the color optical density 100 of the authenticity collation image 57 extracted from the second captured image 88. Then, the authenticity verification processing transitions to step ST216.

In step ST216, the authenticity verification unit 68 determines whether or not the difference between the measured color optical density 100 and the derived predicted color optical density 99 is within the predetermined range. In step ST216, in a case where the difference between the color optical density 100 and the predicted color optical density 99 is within the predetermined range, a positive determination is made, and the verification processing transitions to step ST217. In a case where the difference between the color optical density 100 and the predicted color optical density 99 is not within the predetermined range, a negative determination is made, and the verification processing transitions to step ST218.

In step ST217, the CPU 60A of the verification apparatus 6 transmits the verification signal indicating that the ID card 14 to be verified is verified by the identity verification processing, the validity verification processing, and the authenticity verification processing, from the verification apparatus 6 to the POS terminal 19 that is a transmission source of the verification request 76. Then, the verification processing ends.

In step ST218, the CPU 60A of the verification apparatus 6 transmits non-verification signal indicating that the ID card 14 to be verified is not verified by any of the identity verification processing, the validity verification processing, and the authenticity verification processing, from the verification apparatus 6 to the POS terminal 19 that is the transmission source of the verification request 76. Then, the verification processing ends.

As described above, according to the present embodiment, the verification system 2 comprises the issuing apparatus 4 that issues the ID card 14, and the verification apparatus 6 that verifies the ID card 14. The verification image generation unit 40 of the issuing apparatus 4 acquires the first face image 45 from the original image 10 obtained by imaging the face of the participant 11. The verification image generation unit 40 generates the verification image 21 including the first face image 45 and the validity verification information 48 and outputs the generated verification image 21 to the printer 20 incorporated in the issuing apparatus 4. The ID card output unit 42 of the issuing apparatus 4 causes the printer 20 to print the verification image 21 output from the verification image generation unit 40 on the instant film 15. The ID card output unit 42 acquires the first captured image 46 by causing the camera 34 to capture the verification image 21 printed on the instant film 15 and stores the acquired first captured image 46 in the database 24. Then, the ID card output unit 42 discharges the instant film 15 on which the verification image 21 is printed to the outside as the ID card 14.

Thus, according to the present configuration, the ID card 14 can be created by printing the verification image 21 on the instant film 15. In addition, the authenticity verification unit 68 of the verification apparatus 6 acquires, as the second captured image 88, the image obtained by capturing the verification image 21 printed on the ID card 14 to be verified via the camera 86A. The authenticity verification unit 68 verifies the authenticity of the ID card 14 to be verified by comparing the density characteristics between the first captured image 46 acquired from the database 24 and the second captured image 88. In the field of image processing, comparison of the density characteristics between images is a relatively general-purpose technology. Thus, according to the present configuration, for example, it is possible to provide the verification system 2 that can issue the ID card 14 with which identity verification and validity verification can be simply and quickly performed at a low cost and with which authenticity verification of the ID card 14 can be performed with a simple configuration, compared to a case where an ID card comprises an IC memory for performing the identity verification, the validity verification, and the authenticity verification.

In addition, according to the present embodiment, even in a case where the same image is printed on the instant films 15 of the same type, the authenticity verification unit 68 verifies the authenticity of the ID card 14 using the uncertainty of the color optical density that is variation in the state of occurrence of the density unevenness for each printing. Thus, according to the present configuration, the authenticity verification of the ID card 14 can be performed with a simple configuration at a low cost using a relatively general-purpose technology in the field of image processing, such as comparison of a difference in the density unevenness between images.

In addition, according to the present embodiment, even in a case where the same image is printed on the instant films 15 of the same type, the authenticity verification unit 68 verifies the authenticity of the ID card 14 to be verified using variation in the frequency characteristic of the color optical density of the image for each printing. Thus, according to the present configuration, the authenticity verification of the ID card 14 can be performed with a simple configuration at a low cost using a relatively general-purpose technology in the field of image processing, such as comparison of a difference in the frequency characteristic of the color optical density between images.

In addition, according to the present embodiment, the authenticity verification unit 68 verifies the authenticity of the ID card 14 by taking into consideration a change in time of the color optical density 100 of the verification image 21 printed on the ID card 14 to be verified and then, by comparing the density characteristics. Thus, according to the present configuration, even in a case where a change in time of the color optical density 100 in the ID card 14 to be verified occurs, accurate authenticity verification can be performed, compared to a case where a change in time is not taken into consideration.

In addition, according to the present embodiment, the authenticity collation pattern 50 used for comparing the density characteristics is included in a part of the verification image 21. The authenticity verification unit 68 verifies the authenticity of the ID card 14 by comparing the density characteristics of the authenticity collation image 57 showing the authenticity collation pattern 50 in the first captured image 46 and of the authenticity collation image 57 showing the authenticity collation pattern 50 in the second captured image 88. Thus, according to the present configuration, since the authenticity collation images 57 are compared, a processing load of the verification apparatus 6 necessary for verifying the authenticity can be reduced, compared to a case of comparing the density characteristics of the entire first captured image 46 and the entire second captured image 88.

In addition, according to the present embodiment, the authenticity collation pattern 50 is a plain solid pattern composed of one color. Thus, according to the present configuration, the density characteristic in the authenticity collation image 57 can be simply compared between the first captured image 46 and the second captured image 88, compared to a case of using a collation pattern including a plurality of colors.

In addition, according to the present embodiment, the printer 20 is a printer of the density modulation method. An image printed using the printer of the density modulation method has a different frequency characteristic and different color reproducibility from an image printed using a printer of the area modulation method represented by the ink jet method. Thus, according to the present configuration, it is possible to provide the verification system 2 that, in a case where the ID card 14 is forged using the printer of the area modulation method, can easily determine forgery using a difference related to the frequency characteristic and to the color reproducibility from the printer of the area modulation method.

In addition, according to the present embodiment, the printer 20 is an instant photo printer using the instant film 15 that develops color via a photosensitive material including a silver salt, as a recording medium. Thus, according to the present configuration, the ID card 14 can be instantly issued using the instant photo printer as the printer 20. In addition, the instant film 15 has unevenness of the photosensitive material and unevenness of the developer on the recording surface. Thus, the density characteristic varies even in a case where the same image is recorded at the same location in each of a plurality of instant films 15. By using such a characteristic of the instant film 15, the authenticity verification of the ID card 14 can be performed by comparing the density characteristics even in a case where the ID card 14 is forged using the instant film 15 of the same type as an authorized ID card 14.

In addition, according to the present embodiment, the identity verification unit 64 acquires the face of the owner of the ID card 14 to be verified as the second face image 92. The identity verification unit 64 verifies that the identity of the owner of the ID card 14 to be verified is the creator of the ID card 14 by comparing the first face feature amount 47 extracted from the first face image 45 included in the second captured image 88 with the second face feature amount 94 extracted from the second face image 92. Thus, according to the present configuration, a manager who performs the comparison is not necessary, and accuracy of the identity verification is improved, compared to a case of visually comparing the first face image 45 included in the ID card 14 to be verified with the face of the owner of the ID card 14 to be verified.

In addition, according to the present embodiment, the verification image generation unit 40 embeds the first face feature amount 47 extracted from the first face image 45 in the verification image 21. The identity verification unit 64 verifies that an identity of a person is the owner of the ID card 14 by comparing the first face feature amount 47 extracted from the verification image 21 included in the second captured image 88 obtained by imaging the ID card 14 to be verified, with the second face feature amount 94 extracted from the second face image 92. Thus, according to the present configuration, the first face feature amount 47 is embedded in the verification image 21, and the identity verification is performed based on the first face feature amount 47 extracted from the verification image 21. A processing load of the identity verification in the verification system 2 is reduced, and a processing time is shortened, compared to a case of extracting the first face feature amount 47 from the first face image 45 each time the identity verification is performed.

In addition, according to the present embodiment, the validity verification information 48 and the first face feature amount 47 are embedded in the verification image 21 as the electronic watermark 52. Thus, according to the present configuration, since it is difficult to forge the validity verification information 48 and the first face feature amount 47 compared to a case where the validity verification information 48 and the first face feature amount 47 are embedded in the verification image 21, the ID card 14 of high security can be provided.

In addition, according to the present embodiment, the verification image generation unit 40, the ID card output unit 42, and the first frequency characteristic acquisition unit 44 are incorporated in one housing with the printer 20. Thus, according to the present configuration, the verification system 2 can be disposed in a small space, compared to a case where the verification image generation unit 40, the ID card output unit 42, and the first frequency characteristic acquisition unit 44 have a separate housing from the printer 20.

In addition, according to the present embodiment, the camera 34 that acquires the first captured image 46 is incorporated in the housing. Thus, according to the present configuration, the verification system 2 can be disposed in a small space, compared to a case where the verification image generation unit 40, the ID card output unit 42, and the first frequency characteristic acquisition unit 44 have a separate housing from the printer 20 and from the camera 34.

In addition, according to the present embodiment, the first captured image 46 and the second captured image 88 are acquired by the cameras 34 and 86A, respectively, having the same imaging performance. Thus, according to the present configuration, since an effect of a density characteristic caused by a difference in the imaging performance between the cameras 34 and 86A is reduced, it is easy to compare the density characteristics of the first captured image 46 and the second captured image 88, compared to a case where the first captured image 46 and the second captured image 88 are acquired by cameras having different imaging performance.

Figure 21:
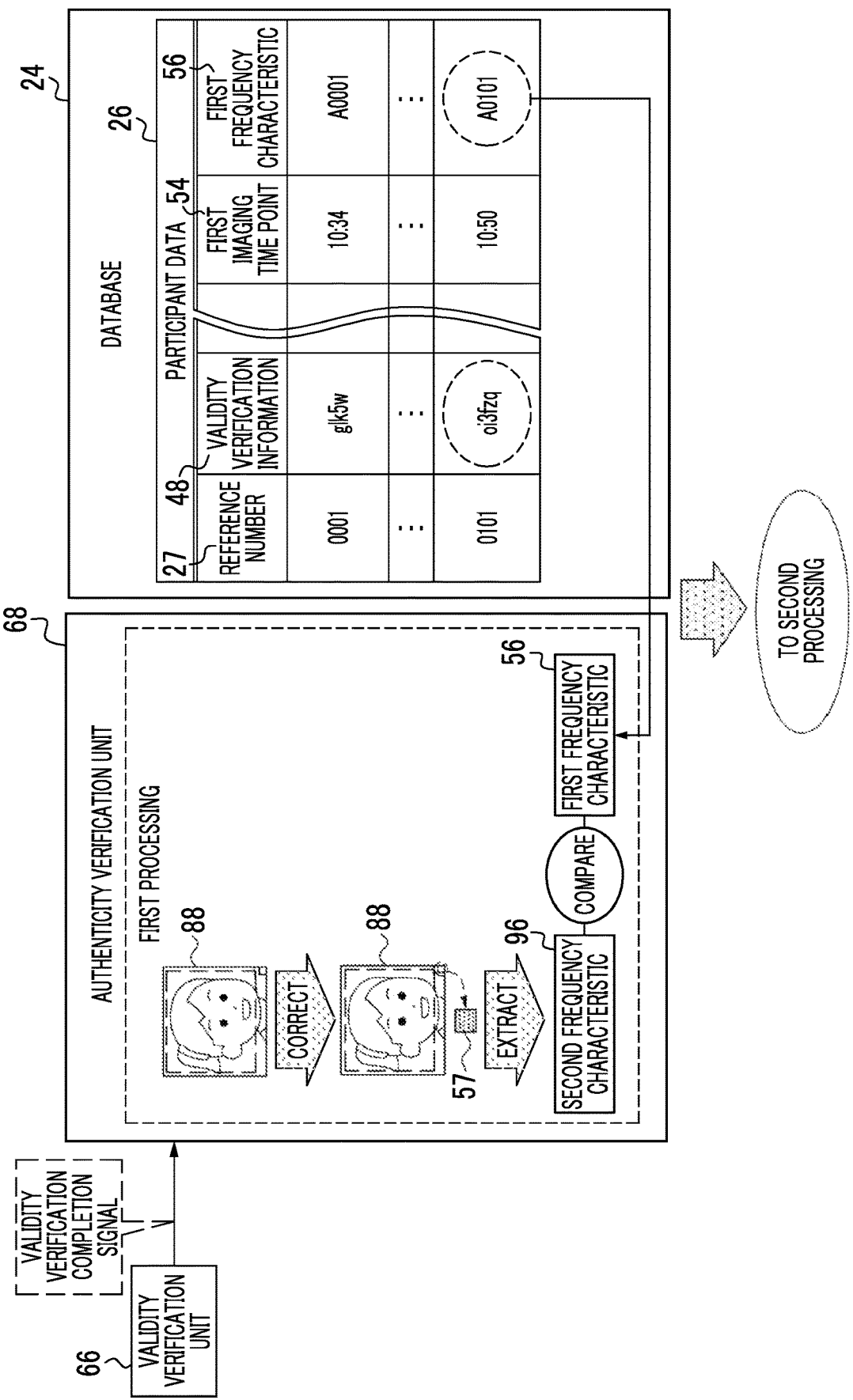
FIG. 21 is a descriptive diagram illustrating another example of the first processing of the authenticity verification processing performed by the authenticity verification unit.

While an example of a form in which the camera 34 that acquires the first captured image 46 and the camera 86A that acquires the second captured image 88 have the same imaging performance is described in the embodiment, the disclosed technology is not limited thereto. The camera 34 that acquires the first captured image 46 and the camera 86A that acquires the second captured image 88 may have different imaging performance. In this case, as illustrated in FIG. 21 as an example, the authenticity verification unit 68 may correct the second captured image 88 based on a difference in the imaging performance between the camera 34 and the camera 86A and may verify the authenticity of the ID card 14 using the corrected second captured image 88. Thus, according to the present configuration, verification accuracy of the authenticity can be improved, compared to a case where the second captured image 88 acquired by the camera 86A having different imaging performance from the camera 34 is used in the authenticity verification.

In addition, while an example of a form in which the printer 20 is the instant photo printer is described in the embodiment, the disclosed technology is not limited thereto. For example, the printer 20 may be a sublimation-type printer of the sublimation-type thermal transfer method. In addition, the sublimation-type printer can use a card made of plastic instead of the dedicated coated paper as a recording medium. In a case of using the sublimation-type printer, the ID card 14 may be created by printing the verification image 21 on the card made of plastic. In addition, the printer 20 may be an ink jet printer of the ink jet method. As illustrated in FIG. 9 and in FIG. 10, the density characteristic varies depending on the printing method. Thus, even in a case where a printer other than the instant photo printer is used, the authenticity of the ID card 14 forged by a printer of a different printing method can be verified.

In addition, even in the sublimation-type printer or the like other than the instant photo printer, in a case where the same image is printed on the recording media of the same type, the uncertainty of the color optical density that is variation in the state of occurrence of the density unevenness for each printing significantly occurs as in the instant photo printer. For example, in the sublimation-type printer, a thermal change caused by heat generation and heat storage of the thermal head occurs. Thus, even in a case where the same image is printed on the recording media of the same type, the density unevenness occurs for each printing. In addition, even in the ink jet printer, a change in landing position of dots occurs. Thus, even in a case where the same image is printed on the recording media of the same type, the density unevenness occurs for each printing. Thus, even in a case where the sublimation-type printer or the like other than the instant photo printer is used, the authenticity of the ID card 14 forged using a printer of the same type can be verified.

However, as described above, the instant film 15 has unevenness of the photosensitive material and the developer. Thus, it is more easy to use the uncertainty of the color optical density in the verification of the authenticity in a case where the ID card 14 is issued by the instant photo printer, than in a case where the ID card 14 is issued by the sublimation-type printer and by the ink jet printer. Thus, the instant photo printer is preferred as the printer 20 over the sublimation-type printer and the ink jet printer.

In addition, the instant film 15 uses an additive color mixing method using a photosensitive material that develops colors of blue (B), green (G), and red (R). Even from this point, the printing method is different from the sublimation-type printer and from the ink jet printer that use a subtractive color mixing method of developing colors of yellow (Y), magenta (M), and cyan (C). Since there is a significant difference in the density characteristic between the additive color mixing method and the subtractive color mixing method, it is easy to find forgery of the ID card 14 made by the sublimation-type printer and by the ink jet printer using the instant photo printer as the printer 20 that issues the ID card 14.

In addition, as described above, the instant photo printer and the sublimation-type printer are printers of the density modulation method, and the ink jet printer is a printer of the area modulation method. The printer of the density modulation method has higher uncertainty of the color optical density than the printer of the area modulation method. This is because while the density unevenness of the ink jet printer is caused by a change in the landing position of dots, the landing positions of the dots are controlled by a mechanical position control of an ink jet head. A cause of the density unevenness in the density modulation method is the unevenness of the photosensitive material and the developer in the instant photo printer, and is a thermal change caused by heat generation and heat storage of the thermal head in the sublimation-type printer. A degree of difficulty is higher for a control of the unevenness of the photosensitive material and the developer or of the thermal change of the thermal head than for the mechanical position control of the ink jet head.

In the embodiment of the disclosed technology, since the uncertainty of the color optical density of the printer is used in the verification of the authenticity, a printer having higher uncertainty of the color optical density is preferred as the printer used in the embodiment of the disclosed technology. Accordingly, a printer of the density modulation method such as the instant photo printer and the sublimation-type printer is preferred over a printer of an area modulation method such as the ink jet printer.

Furthermore, as the printer used in the embodiment of the disclosed technology, the instant photo printer having higher uncertainty of the color optical density than the sublimation-type printer is preferred.

In a case of using the sublimation-type printer and the ink jet printer as the printer 20, it is preferable that a scanning resolution with which the authenticity collation image 57 is scanned is increased, compared to a case of using the instant photo printer. While the sublimation-type printer uses the same density modulation method as the instant photo printer, the uncertainty of the color optical density is lower, compared to the instant film 15. Thus, scanning with higher accuracy is necessary for the sublimation-type printer. In addition, as illustrated in FIG. 9, since the ink jet printer has more density unevenness in the high-frequency region than the instant photo printer, scanning with high accuracy is also necessary for the ink jet printer.

In addition, while an example of a form in which the issuing apparatus 4 incorporates the camera 34 and the printer 20 is described in the embodiment, the disclosed technology is not limited thereto. The camera 34 and/or the printer 20 may have a separate housing from the issuing apparatus 4.

In addition, while an example of a form in which the issuing apparatus 4, the verification apparatus 6, and the database 24 have separate housings is described in the embodiment, the disclosed technology is not limited thereto. The issuing apparatus 4, the verification apparatus 6, and the database 24 may be incorporated in the same housing. Alternatively, at least two of the issuing apparatus 4, the verification apparatus 6, and the database 24 may be incorporated in the same housing. In a case where the issuing apparatus 4 and the verification apparatus 6 are incorporated in the same housing, a single computer may function as the computer 32 and as the computer 60.

In addition, while an example of a form in which the verification system 2 is used in the event of food and/or goods sales is described in the embodiment, the disclosed technology is not limited thereto. For example, the verification system 2 may be used in a commercial facility including a shopping mall, a shopping street, a hotel, and an inn in which payment is made at a plurality of locations. In addition, while an example of a form in which the verification system 2 manages the payment information 30 for each participant 11 is described in the embodiment, the disclosed technology is not limited thereto. For example, the verification system 2 may be used for managing entering and exiting of the participant 11 in a high security facility, a membership facility, and a private event such as a wedding ceremony.

In addition, while an example of a form in which the verification processing is performed in an order of the identity verification processing, the validity verification processing, and the authenticity verification processing is described in the embodiment, the disclosed technology is not limited thereto. An order in which the identity verification processing, the validity verification processing, and the authenticity verification processing are executed can be changed as appropriate. In addition, the identity verification processing, the validity verification processing, and the authenticity verification processing may be performed in parallel.

In addition, while an example of a form in which the authenticity verification processing includes the first processing using the uncertainty of the color optical density of the authenticity collation image 57 and the second processing using the change in time of the color optical density of the authenticity collation image 57 is described in the embodiment, the disclosed technology is not limited thereto. The authenticity verification processing may include at least one of the first processing or the second processing. In addition, an order in which the first processing and the second processing are executed may be changed, or the first processing and the second processing may be performed in parallel.

In addition, while an example of a form in which the authenticity collation pattern 50 is disposed at the lower right corner of the verification image 21 is described in the embodiment, the disclosed technology is not limited thereto. The authenticity collation pattern 50 may be disposed at any location in the verification image 21. In addition, the authenticity collation pattern 50 may be disposed at a location other than the electronic watermark-embedded image 49. In addition, the number of authenticity collation patterns 50 is not limited to one, and a plurality of the authenticity collation patterns 50 may be disposed.

Figure 22:
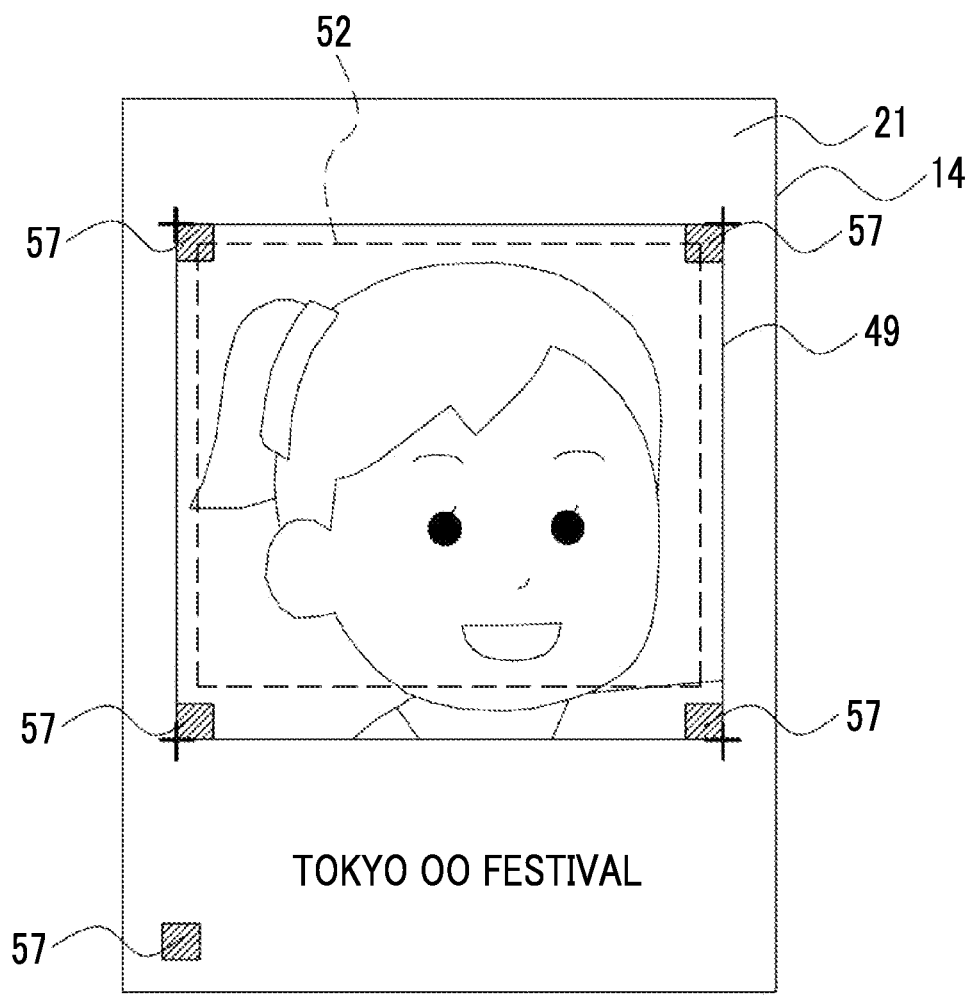
FIG. 22 is a top view illustrating an example of an ID card including a plurality of authenticity collation images.

The example illustrated in FIG. 22 is an example in which the authenticity collation image 57 corresponding to the authenticity collation pattern 50 is printed at a plurality of locations in the ID card 14. In the example illustrated in FIG. 22, the verification image 21 is the entire region of the ID card 14 including the electronic watermark-embedded image 49. The authenticity collation image 57 is printed at the four corners of the electronic watermark-embedded image 49. The authenticity collation image 57 is also printed in a region other than the electronic watermark-embedded image 49.

According to the present configuration, by performing the authenticity verification processing using a plurality of the authenticity collation images 57, accuracy of the authenticity verification processing can be improved, compared to a case of performing the authenticity verification processing using one authenticity collation image 57. This is because the number of density characteristics to be compared is increased.

This effect is particularly remarkable in a case of using the instant film 15. As illustrated in FIG. 7 and in FIG. 8, the instant film 15 has unevenness of the photosensitive material and the developer on the recording surface. In this case, the density characteristics of the plurality of authenticity collation images 57 printed on one instant film 15 using the same authenticity collation pattern 50 easily change depending on a location. Thus, in the instant film 15, as the number of authenticity collation images 57 is increased, the number of different density characteristics to be compared is increased.

In addition, by printing the plurality of authenticity collation images 57, tolerance to scanning error and the like of the authenticity collation images 57 caused by an external disturbance such as a stain is increased, and robustness is improved.

In addition, a two-dimensional code such as a Quick Response (QR) code (registered trademark) may be used as the authenticity collation pattern 50 and as the authenticity collation image 57 obtained by printing the authenticity collation pattern 50. The two-dimensional code such as the QR code (registered trademark) is composed of blocks of a solid pattern of several millimeters square as element. Thus, a part of the two-dimensional code can be used as the authenticity collation pattern 50 and as the authenticity collation image 57. In addition, by using the two-dimensional code, it is easy to use existing software such as a two-dimensional code reader for scanning the authenticity collation image 57.

In addition, as the authenticity collation image 57, a pattern other than the plain solid pattern of one color may be used, or a stripe pattern of two or more colors may be used. In addition, a shape may not be a square shape. Other shapes such as a circular shape, a polygonal shape, an oblong shape, and a striped shape may be used.

In addition, as described above, a size of the authenticity collation image 57 may be a size of several millimeters square. Such a size enables the density characteristics necessary for comparison to be acquired by scanning with, for example, a resolution of approximately 600 dots per inch (dpi). Since the authenticity collation image 57 is relatively small, it is easy to provide a plurality of the authenticity collation images 57 in the ID card 14.

In addition, while an example of using only the image as the verification information is described in the embodiment, a voice other than the image may be used. For example, in a case of capturing the original image 10 via the smart device 8, a voice of the participant 11 is acquired using a voice recording function of the smart device 8. Acquired voice information is registered in the database 24. A URL or the like that enables access to the voice information is recorded in the ID card 14. The voice information registered in such a manner is used as the verification information for the identity verification or for the authenticity verification.

In addition, while the computers 32, 60, and 78 are illustrated in the embodiment, the disclosed technology is not limited thereto. For example, devices including an application specific integrated circuit (ASIC), a FPGA, and/or a programmable logic device (PLD) may be applied instead of the computer 32, 60, or 78. In addition, a combination of a hardware configuration and a software configuration may be used instead of the computer 32, 60, or 78.

In addition, while an example of a form in which the ID card issuing processing is executed by the CPU 32A of the issuing apparatus 4 is illustratively described in the embodiment, the disclosed technology is not limited thereto. Instead of the CPU 32A, a graphics processing unit (GPU) may be employed, or a plurality of CPUs may be employed. In addition, various types of processing may be executed by one processor or by a plurality of physically separated processors.

In addition, while an example of a form in which the verification processing is executed by the CPU 60A of the verification apparatus 6 is illustratively described in the embodiment, the disclosed technology is not limited thereto. Instead of the CPU 60A, a graphics processing unit (GPU) may be employed, or a plurality of CPUs may be employed. In addition, various types of processing may be executed by one processor or by a plurality of physically separated processors.

Figure 23:
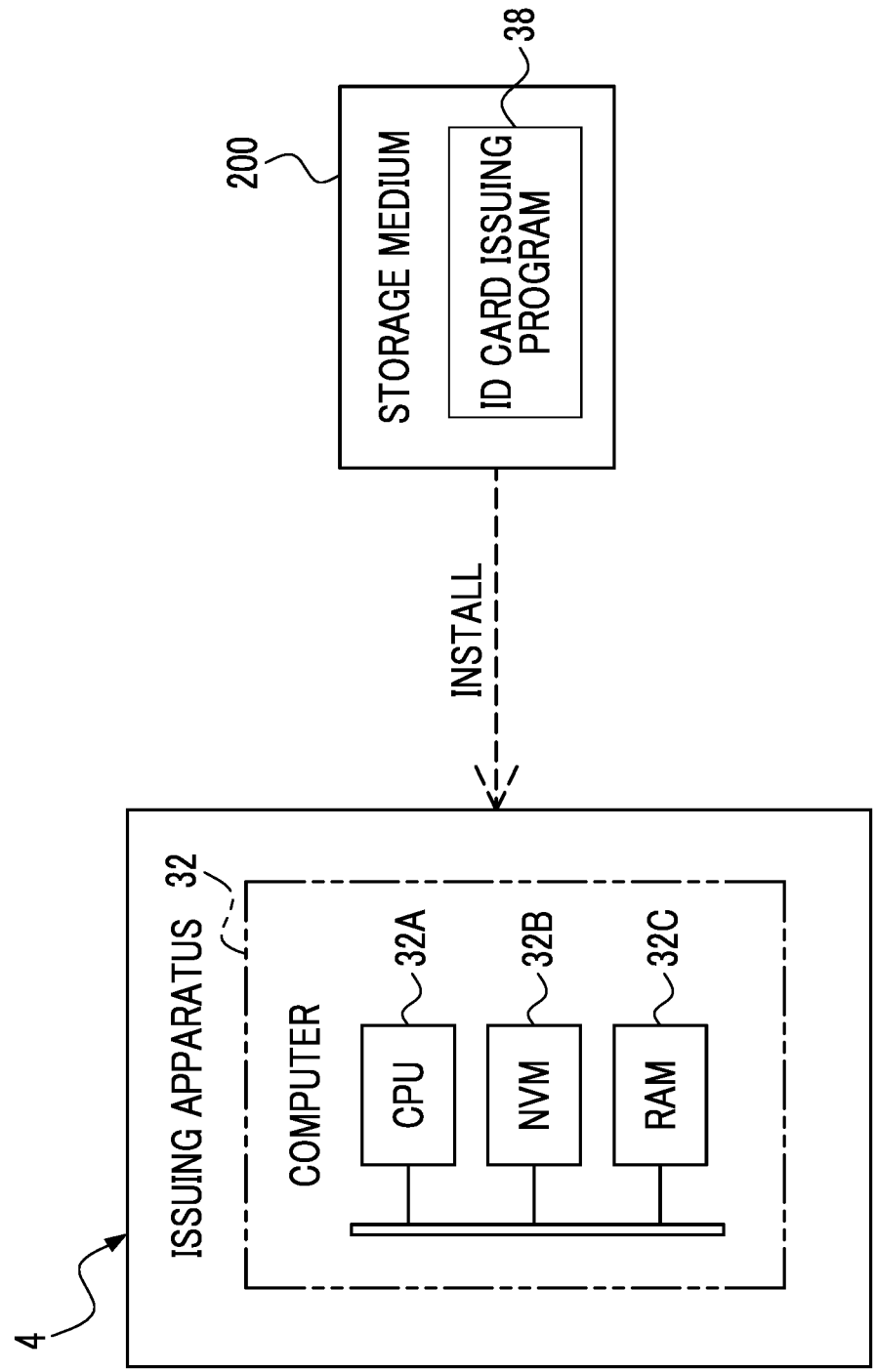
FIG. 23 is a schematic diagram illustrating an example of a form of installing an ID card issuing program stored in a storage medium on a computer.

In addition, while an example of a form in which the ID card issuing program 38 is stored in the NVM 32B is illustratively described in the embodiment, the disclosed technology is not limited thereto. As illustrated in FIG. 23 as an example, the ID card issuing program 38 may be stored in a portable storage medium 200. The storage medium 200 is a non-transitory storage medium. Examples of the storage medium 200 include a SSD or a USB memory. The ID card issuing program 38 stored in the storage medium 200 is installed on the computer 32, and the CPU 32A executes the ID card issuing processing in accordance with the installed ID card issuing program 38.

In addition, the ID card issuing program 38 may be stored in a program memory of another computer, a server apparatus, or the like connected to the computer 32 through a communication network (not illustrated), and the ID card issuing program 38 may be downloaded to the issuing apparatus 4 in response to a request of the issuing apparatus 4. In this case, the ID card issuing processing based on the downloaded ID card issuing program 38 is executed by the CPU 32A of the computer 32.

Figure 24:
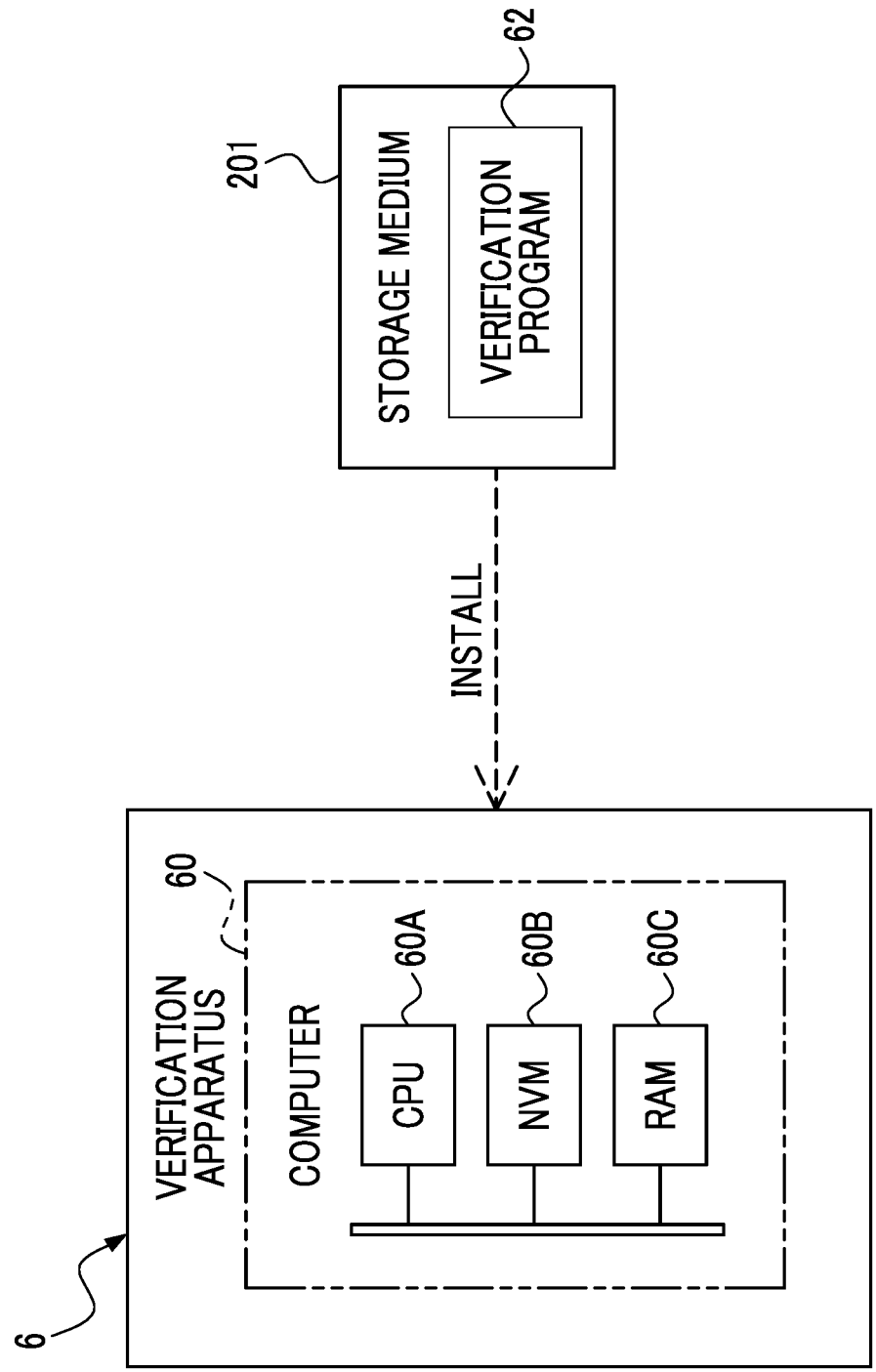
FIG. 24 is a schematic diagram illustrating an example of a form of installing a verification program stored in a storage medium on a computer.

In addition, while an example of a form in which the verification program 62 is stored in the NVM 60B is illustratively described in the embodiment, the disclosed technology is not limited thereto. As illustrated in FIG. 24 as an example, the verification program 62 may be stored in a portable storage medium 201. The storage medium 201 is a non-transitory storage medium. Examples of the storage medium 201 include a SSD or a USB memory. The verification program 62 stored in the storage medium 201 is installed on the computer 60, and the CPU 60A executes the verification processing in accordance with the installed verification program 62.

In addition, the verification program 62 may be stored in a program memory of another computer, a server apparatus, or the like connected to the computer 60 through a communication network (not illustrated), and the verification program 62 may be downloaded to the verification apparatus 6 in response to a request of the verification apparatus 6. In this case, the verification processing based on the downloaded verification program 62 is executed by the CPU 60A of the computer 60.

Various processes illustrated below can be used as a hardware resource for executing the ID card issuing processing and the verification processing. Examples of the processors include, as described above, a CPU that is a general-purpose processor functioning as a hardware resource for executing data processing in accordance with software, that is, a program.

In addition, other examples of the processors include a dedicated electric circuit such as a FPGA, a PLD, or an ASIC that is a processor having a circuit configuration dedicatedly designed to execute specific processing. A memory is incorporated in or connected to any of the processors, and any of the processors executes the data processing using the memory.

The hardware resource for executing the data processing may be composed of one of those various processors or may be composed of a combination of two or more processors of the same type or different types (for example, a combination of a plurality of FPGAs or a combination of a CPU and a FPGA). In addition, the hardware resource for executing the data processing may be one processor.

As an example in which the hardware resource is composed of one processor, first, as represented by a computer such as a client and a server, a form of one processor that is composed of a combination of one or more CPUs and software, and that functions as the hardware resource for executing the data processing is possible. Second, as represented by a system-on-a-chip (SoC) and the like, a form of using a processor that implements functions of the entire system including a plurality of the hardware resources for executing the data processing in one IC chip is possible. Accordingly, the data processing is performed using one or more of the various processors as the hardware resource.

Furthermore, more specifically, an electric circuit in which circuit elements such as semiconductor elements are combined can be used as a hardware structure of those various processors.

In addition, the data processing is merely an example. Accordingly, unnecessary steps may be deleted, new steps may be added, or a processing order may be changed without departing from the gist of the disclosed technology.

Above described contents and illustrated contents are detailed descriptions for parts according to the embodiment of the disclosed technology and are merely an example of the disclosed technology. For example, description related to the above configurations, functions, actions, and effects is description related to an example of configurations, functions, actions, and effects of the parts according to the embodiment of the disclosed technology. Thus, of course, unnecessary parts may be removed, new elements may be added, or parts may be replaced in the above described contents and the illustrated contents without departing from the gist of the disclosed technology. In addition, particularly, description related to common technical knowledge or the like that does not need to be described in terms of embodying the disclosed technology is omitted in the above described contents and the illustrated contents in order to avoid complication and to facilitate understanding of the parts according to the embodiment of the disclosed technology.

In the present specification, "A and/or B" has the same meaning as "at least one of A or B". This means that "A and/or B" may be only A, only B, or a combination of A and B. In addition, in the present specification, the same approach as "A and/or B" is applied to a case where three or more matters are represented by connecting the matters with "and/or".

All documents, patent applications, and technical standards disclosed in the present specification are incorporated in the present specification by reference to the same extent as in a case where each of the documents, patent applications, and technical standards are specifically and individually indicated to be incorporated by reference.

What is claimed is:

1. A verification system of an ID card, the verification system comprising:
    an issuing apparatus that issues an ID card; and
    a verification apparatus that verifies the ID card,
    wherein the issuing apparatus includes a first processor,
    the first processor is configured to:
    acquire a first face image obtained by imaging a face of a person;
    output a verification image including the first face image and verification information for verifying validity to a printer that issues the ID card by printing the verification image on a card-shaped recording medium; and
    store, in a memory, a first captured image obtained by capturing the verification image printed on the ID card via a camera,
    the verification apparatus includes a second processor, and
    the second processor is configured to:
    acquire, as a second captured image, an image obtained by capturing a verification image printed on an ID card to be verified via a camera; and
    verify authenticity of the ID card to be verified by taking into consideration a change in time of a color optical density of the verification image printed on the ID card and comparing density characteristics of each of the first captured image acquired from the memory and the second captured image acquired from the camera.

2. The verification system of the ID card according to claim 1,
    wherein the second processor is configured to, even in a case where the same image is printed on recording media of the same type, verify the authenticity of the ID card to be verified using uncertainty of the color optical density that is variation in a state of occurrence of density unevenness for each printing.

3. The verification system of the ID card according to claim 1,
    wherein the second processor is configured to, even in a case where the same image is printed on recording media of the same type, verify the authenticity of the ID card to be verified using variation in a frequency characteristic of the color optical density of the image for each printing.

4. The verification system of the ID card according to claim 1,
    wherein a collation part used for comparing the density characteristics is included in a part of the verification image, and
    the second processor is configured to verify the authenticity of the ID card by comparing density characteristics of the collation part of each of the first captured image and the second captured image.

5. The verification system of the ID card according to claim 4,
    wherein the collation part is a plain solid pattern composed of one color.

6. The verification system of the ID card according to claim 1,
    wherein the printer is a printer of a density modulation method.

7. The verification system of the ID card according to claim 6,
    wherein the printer is an instant photo printer that uses an instant film developing color via a photosensitive material including a silver salt as the recording medium.

8. The verification system of the ID card according to claim 1,
    wherein the second processor is configured to:
    acquire a face of a person who is an owner of the ID card to be verified as a second face image; and
    verify that an identify of the owner of the ID card to be verified is correct by comparing a feature amount of the face extracted from the first face image included in the second captured image with a feature amount of the face extracted from the second face image.

9. The verification system of the ID card according to claim 8,
    wherein the first processor is configured to embed the feature amount of the face extracted from the first face image in the verification image, and
    the second processor is configured to verify that an identity of the person is the owner of the ID card by comparing the feature amount of the face extracted from the verification image included in the second captured image with the feature amount of the face extracted from the second face image.

10. The verification system of the ID card according to claim 9,
    wherein the verification information and the feature amount of the face are embedded in the verification image as an electronic watermark.

11. The verification system of the ID card according to claim 1,
    wherein the first processor and the printer are incorporated in one housing.

12. The verification system of the ID card according to claim 11,
    wherein the camera that acquires the first captured image is incorporated in the housing.

13. The verification system of the ID card according to claim 1,
    wherein the first captured image and the second captured image are acquired by cameras having the same imaging performance.

14. The verification system of the ID card according to claim 1,
    wherein the second processor is configured to:
    correct the second captured image based on a difference in imaging performance between the camera that acquires the first captured image and the camera that acquires the second captured image; and
    verify the authenticity of the ID card to be verified using the second captured image after correction.

15. A verification method of an ID card using an issuing apparatus of an ID card and a verification apparatus of the ID card, the verification method comprising:
    causing the issuing apparatus of the ID card to execute
    a first face image acquisition step of acquiring a first face image obtained by imaging a face of a person,
    an output step of outputting a verification image including the first face image and verification information for verifying validity to a printer that issues the ID card by printing the verification image on a card-shaped recording medium, and
    a storage step of storing, in a memory, a first captured image obtained by capturing the verification image printed on the ID card via a camera; and causing the verification apparatus of the ID card to execute a second captured image acquisition step of acquiring, as a second captured image, an image obtained by capturing a verification image printed on an ID card to be verified via a camera, and a verification step of verifying authenticity of the ID card to be verified by taking into consideration a change in time of a color optical density of the verification image printed on the ID card and comparing density characteristics of each of the first captured image acquired from the memory and the second captured image acquired from the camera.

16. A non-transitory computer-readable storage medium storing a verification program of an ID card for operating a verification system of an ID card including a first computer that issues an ID card, and a second computer that verifies the ID card, the verification program causing the first computer to execute a first face image acquisition step of acquiring a first face image obtained by imaging a face of a person;

an output step of outputting a verification image including the first face image and verification information for verifying validity to a printer that issues the ID card by printing the verification image on a card-shaped recording medium; and a storage step of storing, in a memory, a first captured image obtained by capturing the verification image printed on the ID card via a camera, the second computer to execute a second captured image acquisition step of acquiring, as a second captured image, an image obtained by capturing a verification image printed on an ID card to be verified via a camera; and a verification step of verifying authenticity of the ID card to be verified by taking into consideration a change in time of a color optical density of the verification image printed on the ID card and comparing density characteristics of each of the first captured image acquired from the memory and the second captured image acquired from the camera.

\* \* \* \* \*